(12) United States Patent
Yabe et al.

(10) Patent No.: US 6,592,264 B2
(45) Date of Patent: Jul. 15, 2003

(54) ROLLING BEARING

(75) Inventors: Toshikazu Yabe, Kanagawa (JP);
Takahiko Uchiyama, Kanagawa (JP);
Keisuke Yokoyama, Kanagawa (JP);
Nariaki Aihara, Kanagawa (JP)

(73) Assignee: NSK Ltd., Tokyo (JP)

( * ) Notice: Subject to any disclaimer, the term of this patent is extended or adjusted under 35 U.S.C. 154(b) by 18 days.

(21) Appl. No.: 09/951,485

(22) Filed: Sep. 14, 2001

(65) Prior Publication Data
US 2003/0002759 A1 Jan. 2, 2003

(30) Foreign Application Priority Data

Jun. 15, 2001 (JP) .................................. 2001-181835
Jun. 18, 2001 (JP) .................................. 2001-183403

(51) Int. Cl.$^7$ .............................................. F16C 33/78
(52) U.S. Cl. ..................................................... 384/484
(58) Field of Search ........................... 277/938; 384/477, 384/484

(56) References Cited

U.S. PATENT DOCUMENTS 3,785,856 A * 1/1974 Gotoh ........................ 277/571
4,631,309 A * 12/1986 Thormer et al. ............. 524/426
5,274,049 A * 12/1993 Zielinski et al. ............. 525/356
6,028,137 A * 2/2000 Mahmud et al. ............ 524/496

* cited by examiner

Primary Examiner—Thomas R. Hannon
(74) Attorney, Agent, or Firm—Sughrue Mion, PLLC

(57) ABSTRACT

The present invention provides a rolling bearing having a prolonged life suitable for wheel, railway vehicle and steel rolling mill comprising a sealing member which exhibits fair sealing properties even under severe conditions. A rolling bearing comprising an outer ring having an outer raceway formed on the inner surface thereof, an inner ring having an inner raceway formed on the outer surface thereof, a plurality of rolling elements rollably provided between the outer ring and the inner ring, and a sealing member for sealing the axial opening of the space between the inner surface of the outer ring and the outer surface of the inner ring in which said rolling elements are provided, characterized in that the sealing member is formed by an elastic member made of a vulcanizable rubber composition obtained by blending a carboxylated acrylonitrile-butadiene rubber with at least carbon black.

16 Claims, 7 Drawing Sheets

ROLLING BEARING

BACKGROUND IF THE INVENTION

The present invention relates to a rolling bearing provided with a sealing member for preventing the leakage of enclosed grease as well as the entrance of dust, water, muddy water, etc. into the interior of the bearing as in wheel rolling bearing for bearing the wheel of automobile or railway vehicle or rolling bearing for steel rolling device.

For example, a wheel rolling bearing for bearing the wheel of automobile is occasionally forced to be not only exposed to much dust but also operated while the wheel being dipped in muddy water. The rolling bearing is also exposed to wash water when the automobile is washed. Due to outdoor use, a rolling bearing for bearing the wheel of railway vehicle is also exposed to dust and weather in operation and to wash water when the vehicle is washed.

When the rolling bearing is used under such severe conditions, the sealing member of the rolling bearing is subject to removal of lubricant such as grease which has been previously applied to a lip portion of the sealing member. Thus, an elastic member constituting the lip portion undergoes abnormal abrasion that deteriorates the sealing properties of the sealing member, thereby making it more likely that water, dust, etc. can enter into the interior of the rolling bearing. As a result, the rolling bearing can difficultly maintain its desired properties over an extended period of time. In the worst case, the rolling bearing can break in an early stage. Even if the rolling bearing can maintain its desired sealing properties, the heat generated by sliding of the lip portion with respect to the bearing member causes the deterioration of lubricant such as enclosed grease because the lip portion possibly has no sufficient lubricant present thereon. In this case, it is difficult to maintain desired properties over an extended period of time.

Further, the rolling bearing for steel rolling device is much exposed to dust such as iron ore dust and coke dust and also is used while being sprayed with cooling water for cooling the bearing itself. Accordingly, the rolling bearing for steel rolling device is difficult to maintain its desired properties over an extended period of time similarly to the rolling bearing for vehicle.

Heretofore, the sealing member of the foregoing wheel rolling bearing has comprised an elastic member formed by a rubber material composition having proper additives incorporated in an ordinary nitrile rubber. As well known, a rolling bearing for automobile wheel is used outdoor and thus can be exposed to much dust. The rolling bearing is also used under conditions such that it is exposed to rain water or wash water or, in the worst case, dipped in muddy water. A sealing member comprising an elastic member formed by an ordinary nitrile rubber material composition exhibits sufficient sealing properties even while being lubricated under so-called clean conditions such that it is relatively little subject to exposure to water and dust. However, under recent requirements that the life of wheel bearing be prolonged or the torque of the wheel bearing be lowered to enhance the fuel economy of automobile, the grease applied to the lip portion can undergo softening or emulsification in an extreme case under the foregoing severe conditions. When the grease runs out, it is impossible to maintain desired lubricity sufficiently. Further, the lip can undergo abnormal abrasion that deteriorates the sealing properties of the sealing member, so that it is more likely occurred that dust or water can enter into the interior of the bearing and hence making it impossible to maintain desired bearing properties over an extended period of time. In order to improve the sealing properties of the sealing member, the increase of the fastening margin can be proposed. However, this approach causes the rise of torque, so that the lip likely undergo abrasion that deteriorates the sealing properties of the sealing member. Further, the resulting abrasion heat causes the deterioration of grease so that the life of the bearing is likely reduced.

In an attempt to eliminate these defectives, it has been practiced to incorporate a solid lubricant such as fluororesin and molybdenum disulfide and a wax such as paraffin wax and aliphatic acid amide in the rubber composition constituting the elastic member so that the abrasion of the lip portion can be inhibited and the generation of heat due to sliding and the rotary torque can be lowered even when the grease runs out, making it impossible to keep the bearing lubricated sufficiently.

Further, the wheel rolling bearing provided with a sealing member comprising an elastic member formed by the conventional nitrile rubber composition cannot operate for a sufficiently prolonged life under the foregoing severe working conditions.

SUMMARY OF THE INVENTION

It is therefore an object of the present invention to provide a rolling bearing having a prolonged life suitable for wheel, railway vehicle and steel rolling mill comprising a sealing member which exhibits fair sealing properties even under such severe conditions.

The foregoing object of the present invention will become apparent from the following detailed description and examples.

The object of the invention is accomplished with a rolling bearing comprising an outer ring having an outer raceway formed on the inner surface thereof, an inner ring having an inner raceway formed on the outer surface thereof, a plurality of rolling elements rollably provided between the outer ring and the inner ring, and a sealing member for sealing an axial opening of a space defined between the inner surface of the outer ring and the outer surface of the inner ring in which the rolling elements are provided, wherein the sealing member is formed by an elastic member made of a vulcanizable rubber composition obtained by blending a carboxylated acrylonitrile-butadiene rubber with at least carbon black.

Further, in addition to above the construction, the carboxylated acrylonitrile-butadiene rubber may further comprises a silicone oil incorporated therein.

BRIEF DESCRIPTION OF THE DRAWINGS

By way of example and to make the description more clear, reference is made to the accompanying drawings in which.

DETAILED DESCRIPTION OF THE PREFERRED EMBODIMENTS

The preferred embodiments according to the present invention will be further described hereinafter.

Figure 1:
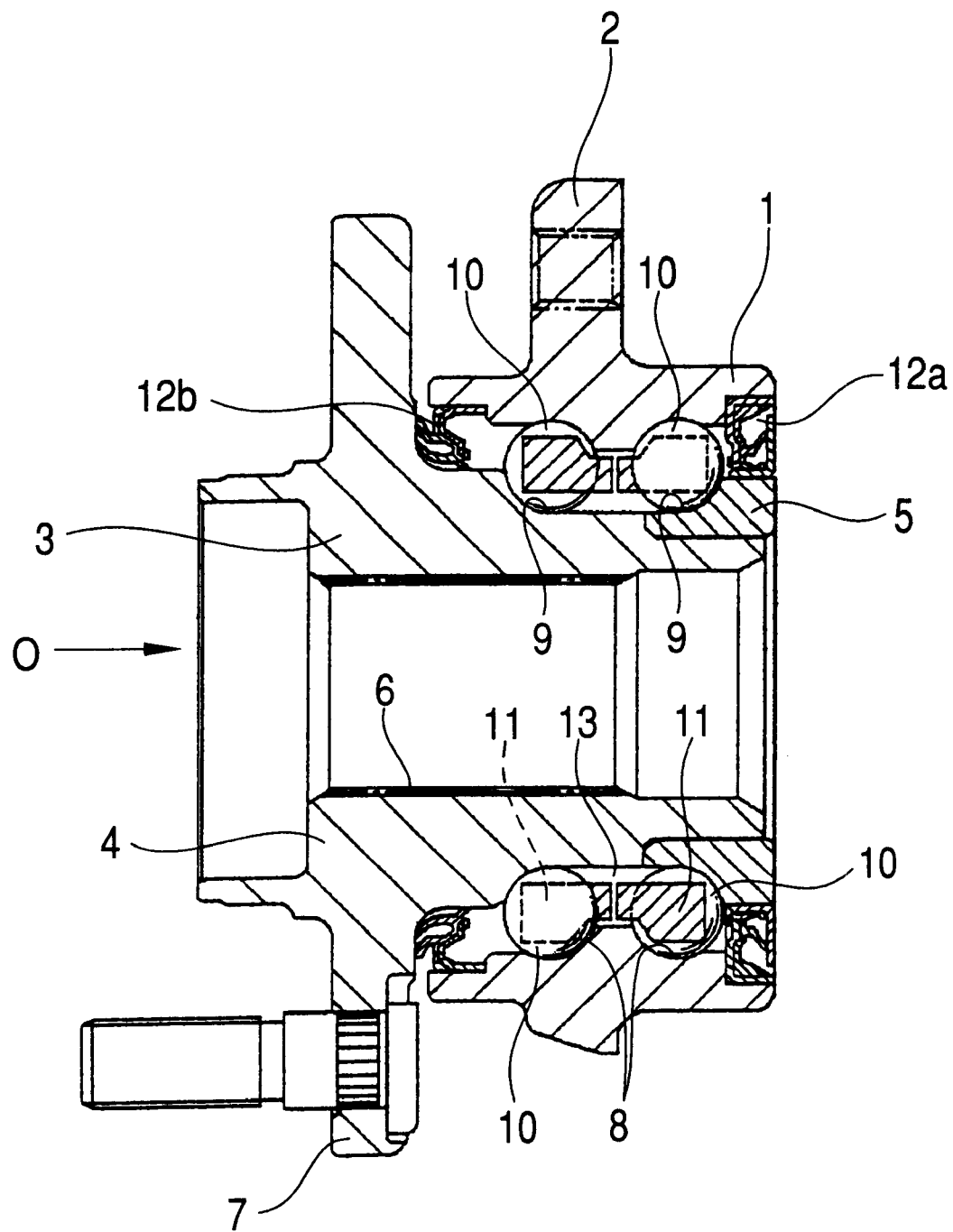
FIG. 1 is a sectional view illustrating an embodiment of the rolling bearing according to the invention (for bearing automobile wheel)
Figure 2:
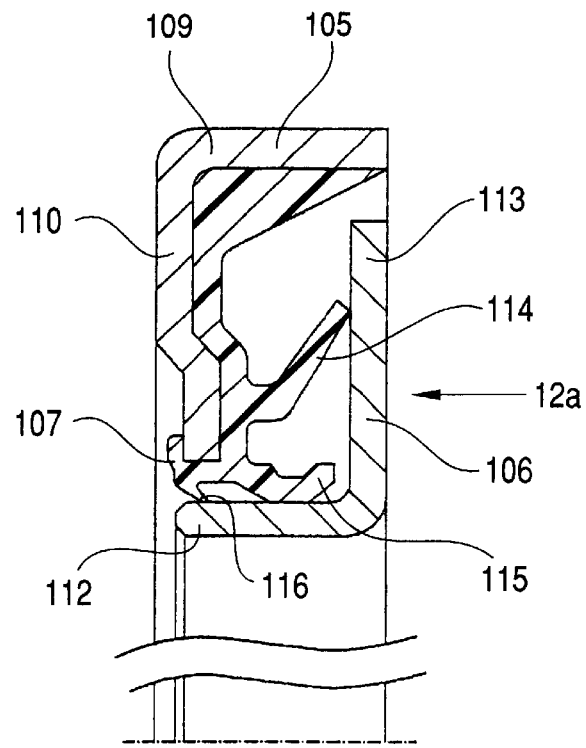
FIG. 2 is an enlarged view of one of the sealing member (12a) of the rolling bearing shown in FIG. 1.
Figure 3:
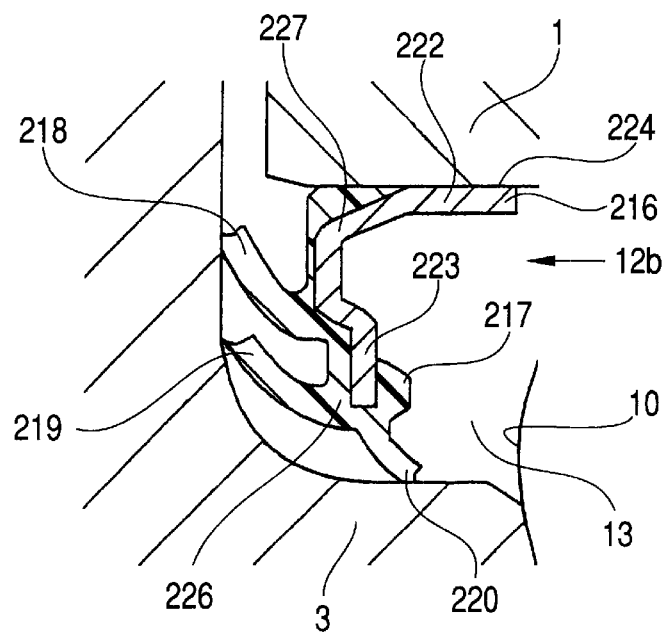
FIG. 3 is an enlarged view of the other sealing member (12b) of the rolling bearing shown in FIG. 1.

In the present invention, the structure of the rolling bearing itself is not specifically limited. Rolling bearings for vehicle as shown in FIGS. 1 to 3 can be used byway of example. Further, the structure of the sealing member itself is not specifically limited. Similarly, sealing members as shown in FIGS. 1 to 3 can be used by way of example. The elastic member is formed by the rubber composition described below.

As a rolling bearing for automobile wheel there is known one having the structure as shown in FIG. 1 is known. In the rolling bearing O shown in FIG. 1, a outer-member 1 corresponding to outer ring as a fixed ring is fixed supported on a suspension system (not shown) with a fitting portion 2 formed on the outer surface thereof. Accordingly, the outer-member 1 doesn't rotate even in operation. On the inner side of the outer-member 1 is provided an inner-member 3 corresponding to outer ring as a rotary ring coaxially with the outer-member 1. In operation, the inner-member 3 rotates The inner-member 3 comprises a hub 4 and an inner ring 5. The hub 4 has a spline race 6 formed on the inner surface thereof and a fitting flange 7 formed on the outer surface of the external end thereof (end which is radially outer as viewed during mounting to vehicle or left end as viewed in FIG. 1). During mounting to vehicle, in the spline race 6 is inserted a driving shaft which is rotationally driven via a constant velocity joint. To the fitting flange 7 is fixed a wheel.

The outer-member 1 has two lines of outer raceways 8, 8 formed on the inner surface thereof. The hub 4 has an inner raceway 9 formed on the outer surface of the middle portion thereof. The inner ring 5 has an inner raceway 9 formed on the outer surface thereof. Rolling elements 10, 10 are provided between the outer raceways 8, 8 and the inner raceways 9, 9 so that the inner-member 3 can freely rotate on the inner side of the outer-member 1. In order to retain the rolling elements 10, 10 rotatably, retainers 11, 11 are provided. As the rolling elements 10, 10 there are shown used balls. However, a tapered roller may be used as a rolling element for the hub unit of vehicle having a heavy weight. Sealing members 12 and 12b are provided between the external end of the outer-member 1 and the outer surface of the middle portion of the hub 4 to seal the external opening of the space 13 in which the rolling elements 10, 10 are provided between the inner surface of the outer-member 1 and the inner-member 3.

The sealing member 12a comprises a core metal 105, a slinger 106, and an elastic member 107 as shown in an enlarged view of FIG. 2. Among these components, the core metal 105 is an integrally formed component obtained by subjecting a metal plate such as low carbon steel plate to punching such as pressing and plastic machining. The core metal 105 is in the form of cylinder having an L-shaped section comprising an outer cylinder portion 109 which can be freely fitted and fixed onto the inner surface of the end of the outer-member I constituting the rolling bearing O and an inner ring portion 110 which extends from the axially inner end (left end as viewed in FIG. 2) of the outer cylinder portion 109 inward radially. The foregoing slinger is an integrally formed component obtained by subjecting a metal plate having an excellent corrosion resistance such as stainless steel plate to punching such as pressing and plastic machining. The slinger 106 is in the form of cylinder having an L-shaped section comprising an inner cylinder portion 112 which can be freely fitted and fixed onto the outer surface of the external end of the inner ring 5 constituting the rolling bearing O and an outer ring portion 113 which extends from the axially outer end (right end as viewed in FIG. 2) of the inner cylinder portion 112.

The foregoing elastic member 107 is formed by the rubber composition of the invention and comprises three seal lips, i.e., outer seal lip 114, middle seal lip 115 and inner seal lip 116. The base portion of the elastic member 107 is connected and fixed to the core metal 105. The tip of the outer seal lip 114, which is disposed outermost, is brought into sliding contact with the inner surface of the outer ring portion 113, which constitutes the slinger 106. The tip of the other two seal lips, i.e., middle seal lip 115 and inner seal lip 116 are brought into sliding contact with the outer surface of the inner cylinder portion 112, which constitutes the slinger 106. In this arrangement, the leakage of enclosed grease can be prevented. At the same time, the entrance of dust, water, muddy water, etc. into the bearing can be prevented.

The sealing member 12b comprises a core metal 216 and an elastic member 217 which are each in conical form as shown in an enlarged view of FIG. 3. Among these components, the core metal 216 is formed by a metal plate and is fitted and fixed onto the outer end of the outer-member 1. The elastic member 217 is formed by the rubber composition of the invention and is molded with the core metal 216 and connected and fixed to the core metal 216 with an adhesive or the like. The elastic member 217 comprises two side seal lips, i.e., outer seal lip 218 and inner lip 219, and a radial seal lip 220. The elastic member 217 has the two side seal lips 218 and 219 disposed tilted such that they extend outward radially (upward as viewed in FIG. 3) toward the tip thereof (left end as viewed in FIG. 3) to be rendered capable of preventing the entrance of foreign matters into the space 13. Further, the radial seal lip 220 is disposed tilted such that it extends the interior of the space 13 (rightward as viewed in FIG. 3) toward the tip thereof (lower end as viewed in FIG. 3) to be rendered capable of preventing the leakage of grease.

Explaining in some detail, the sealing member 12b comprises a core metal 216 and an elastic member 217 which are each in conical form. The core metal 216 of the sealing member 12 is an integrally formed component obtained by subjecting a metal plate such as low carbon steel plate to punching such as pressing and plastic machining. The core metal 216 comprises an outer cylinder portion 222 which can be freely fitted and fixed onto the inner surface of the end of the outer-member 1 constituting the rolling bearing O and a supporting plate portion 223 which extends from the outer end (left end as viewed in FIG. 3) of the outer cylinder portion 222 inward radially. Among these components, the outer cylinder portion 222 comprises a large diameter portion 224 disposed close to the inner end (close to the right end as viewed in FIG. 3) and an elastic member 217 to cover the whole of the outer surface (left surface as viewed in FIG. 3) of the supporting plate 223 constituting the core metal 216. Further, the outer edge of the elastic member 217 is clamped between the outer surface of the tilted portion 227 extending from the cylinder portion 222 and the inner surface of the open end of the outer-member 1. In this arrangement, the area at which the core metal 216 and the outer-member 1 are fitted to each other is sealed. The outer diameter of the large diameter portion 224 in free state is designed to be slightly greater than the inner diameter of the opening of the outer end of the outer-member 1. In this arrangement, the large diameter portion 224 is close-fitted in the opening of the outer end of the outer-member 1 so that it can be freely fitted therein. The supporting plate 223 has an S-shaped section and is tilted such that it approaches to the rolling elements 10, 10 provided in the space 13 (rightward as viewed in FIG. 3) as it extends inward radially (downward as viewed in FIG. 3).

On the other hand, the elastic member 217, which constitutes the sealing member 12b together with the core metal 216, is formed by the rubber composition of the invention. The elastic member 217 is insert-molded with the core metal 216 to constitute the sealing member 12b. The elastic member 217 is bonded and fixed to the core metal 216 with an adhesive or the like. The outer edge of the elastic member 217 covers the outer surface of the tilted portion 227. The outer diameter of the area in free state at which a part of the elastic member 217 covers the outer surface of the tilted portion 227 is designed to be slightly greater than the inner diameter of the opening of the outer end of the outer-member 1. While the large diameter portion 224 is fitted and fixed onto the opening of the outer end of the outer-member 1, the area at which a part of the elastic member 217 covers the outer surface of the tilted portion 227 is elastically pressed between the outer surface of the tilted portion 227 and the inner surface of the opening of the outer end of the outer-member 1 so that it is provided with sealing properties.

The base portion 226 of the elastic member 217 covers the entire outer surface (left surface as viewed in FIG. 3) of the supporting plate 223. The base portion 226 has two side seal lips, i.e., outer side seal lip 218 and inner side seal lip 219, and a radial seal lip 220 formed on the outer surface and inner edge thereof, respectively. The elastic member 217 has the two side seal lips 216 and 219 disposed tilted such that they extend outward radially (upward as viewed in FIG. 3) toward the tip thereof (left end as viewed in FIG. 3) to be rendered capable of preventing the entrance of foreign matters into the space 13. Further, the radial seal lip 220 is disposed tilted such that it extends the interior of the space 13 (rightward as viewed in FIG. 3) toward the tip thereof (lower end as viewed in FIG. 3) to be rendered capable of preventing the leakage of grease.

Figure 4:
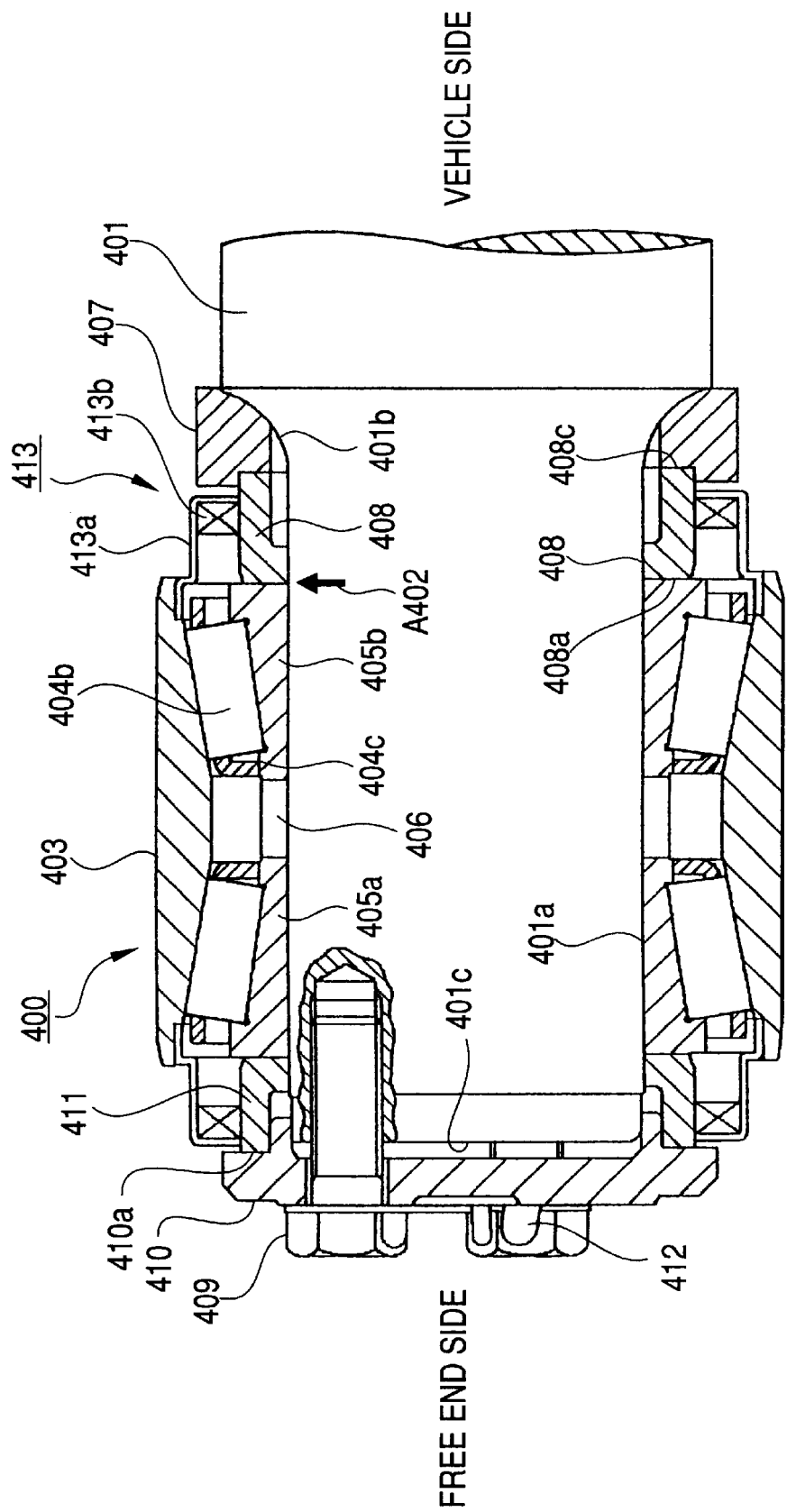
FIG. 4 is a sectional view illustrating another embodiment of the rolling bearing according to the invention (for bearing railway vehicle wheel)

As a rolling bearing there may be used a rolling bearing for vehicle for bearing the wheel of railway vehicle as shown in FIG. 4 by way of example. FIG. 4 indicates a vehicle portion 400. A wheel (not shown) is attached to the right side (wheel side W') of the vehicle portion 400 as viewed in FIG. 4. The vehicle portion 400 comprises a rotary shaft 401 and a bearing 402 for bearing the shaft 401. The bearing 402 has an outer ring 403 fixed to the shaft housing or the like of a railway vehicle (not shown).

The bearing 402 has two rows of tapered rollers 404a and 404b disposed facing outward and thus is designated as a so-called sealed double row tapered roller bearing. The bearing 402 comprises an outer ring 403 fixed to the shaft housing or the like, inner rings 405a and 405b which are separately provided for the two rows of tapered rollers and a washer 406 disposed therebetween. The tapered rollers 404a and 404b are retained by a retainer 404c. In order to fix the bearing 402 to a journal 401a which receives the load of the shaft 401 in a predetermined position, the journal 401a comprises a shaft neck 401b having a great outer diameter provided on the wheel side W' thereof. The wheel side W' comes in contact with the side end of the inner ring 405b with the interposition of a rear cover 407 disposed in contact with the shaft neck 401b and an oil-throwing sleeve 408. The free end F' of the journal 401a has a forward cover 410 fixed to the end 401c thereof with a bolt 409. The free side end of the inner ring 405a is brought into contact with the holding portion 410a of the forward cover 410 with the interposition of the oil-throwing sleeve 411 of the free side end F'. By fastening the bolt 409 at a predetermined torque, the bearing 402 is fixed interposed between the shaft neck 401b and the forward cover 410. The member indicated by the reference numeral 412 is a stopper fixture for preventing the looseness of the bolt 409. The member indicated by the reference numeral 413 is a sealing member for preventing the entrance of water or foreign matters into the interior of the bearing 402 and the leakage of lubricant such as grease enclosed in the interior of the bearing 402. The sealing member is provided both at the wheel side W' and the free end side F' in the same arrangement.

Figure 5:
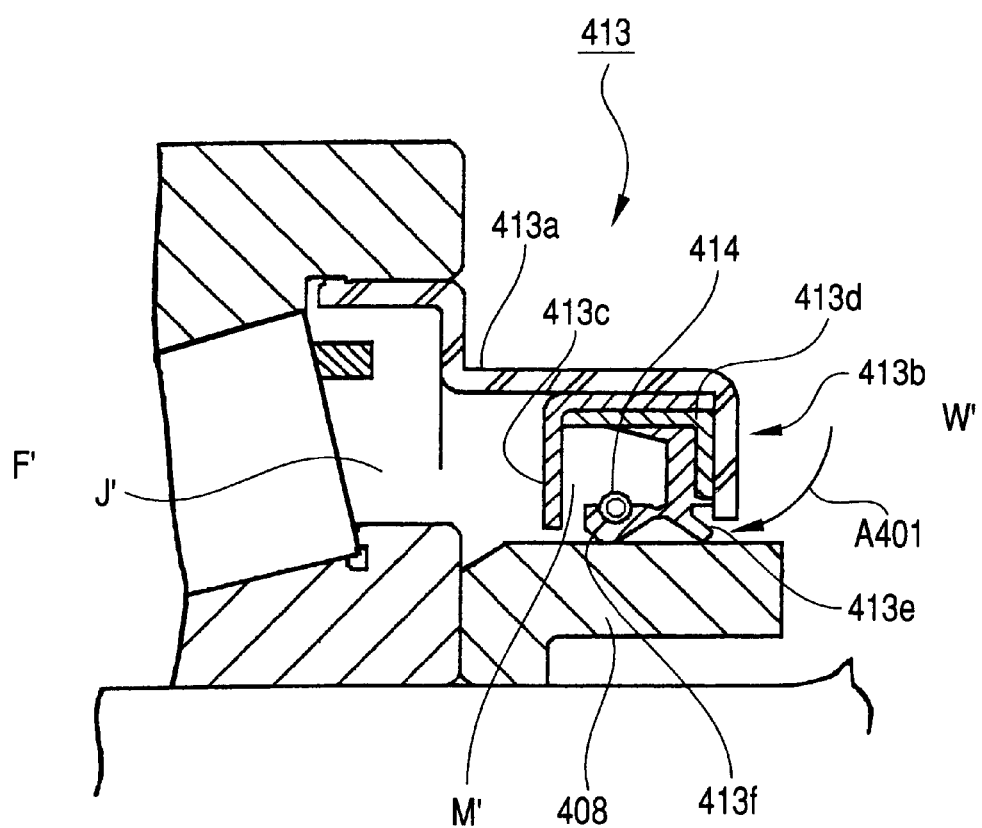
FIG. 5 is an enlarged view illustrating the sealing member of the rolling bearing shown in FIG. 4.

The sealing member 413 comprises a seal case 413a fitted and fixed onto both sides of the outer ring 403 and an oil seal 413b disposed in sealing contact with the sliding outer surface of the oil-throwing sleeve 408 mounted on the end of the seal case 413b as shown in an enlarged view of FIG. 5 (only at the wheel side W'). The oil seal 413b has a spring cover 413c and a reinforcement ring 413d fitted to the inner side of the spring cover 413c which are fitted and fixed to the interior thereof. In this arrangement, water or foreign matters which have entered from the exterior in the direction indicated by the arrow A401 can be blocked by a dust lip 413e and a main lip 413f. Further, the leakage of lubricant such as grease enclosed in the interior of the bearing 402 can be prevented. The dust lip 413e and main lip 413f each are an elastic member obtained by molding the rubber composition of the invention. The member indicated by the reference numeral 414 is a spring ring for energizing the main lip 413f. The spring cover 413c has a radial portion extending close to the outer sliding surface of the oil-throwing sleeve 408. Thus, the interior of the sealing member 413 is almost divided into a tapered roller side J' and an oil seal side M'. In this arrangement, the entrance of abrasion dust produced from the lip at the oil seal side M' into the tapered roller side J' can be prevented. Further, the entrance of abrasion metal dust produced at the tapered roller side J' into the oil seal side M' can be prevented.

The rubber composition constituting the elastic members 107, 217, dust lip 413e and main lip 413f to be used in the various sealing members will be further described hereinafter.

In the rolling bearing of the invention, the elastic member constituting the sealing member is formed by a vulcanizable rubber composition obtained by blending a carboxylated acrylonitrile-butadiene rubber with at least carbon black as a reinforcing filler.

A carboxylated acrylonitrile-butadiene rubber has a carboxyl group incorporated in its molecule. Thus, crosslinking reaction proceeds also at the carboxyl group moiety in the presence of a metal oxide such as zinc oxide as a vulcanization accelerator added at the same time to give a higher tensile strength than ordinary nitrile rubber. Accordingly, the use of a rubber composition comprising as a raw rubber such a carboxylated acrylonitrile-butadiene rubber makes it possible to obtain a sealing member excellent in abrasion resistance.

The carboxylated acrylonitrile-butadiene rubber is synthesized by adding an ethylenically unsaturated carboxylic acid such as acrylic acid and methacrylic acid, which is a carboxylic group-containing monomer, or anhydride thereof in addition to acrylonitrile and butadiene, which are ordinary monomers to be used in the polymerization of acrylonitrile-butadiene rubber, during preparation such as emulsion polymerization. Alternatively, acrylonitrile-butadiene rubber and an ethylenically unsaturated carboxylic acid such as maleic anhydride or anhydride thereof may be kneaded in a batchwise heat sealed kneader such as pressure kneader, Banbury mixer and Brabender to produce the carboxylated acrylonitrile-butadiene rubber.

The actual amount of carboxyl group in the obtained polymer is, in terms of an acid-equivalent weight, preferably $1 \times 10^{-4}$ ephr or more, and more preferably $2 \times 10^{-3}$ to $5 \times 10^{-2}$ ephr. If the acid-equivalent weight is less than $1 \times 10^{-4}$ ephr, the cross linking density is almost the same in comparison with acrylonitrile-butadiene rubber (not yet carboxylated), and accordingly the tensile strength and the abrasion resistance of rubber material composition are scarcely improved.

For the determination of acid equivalent, the rubber is dissolved in acetone. The rubber is then reprecipitated and purified with n-hexane. The rubber thus reprecipitated and purified is redissolved in pyridine. The rubber solution is then titrated with a 0.02 N ethanol solution of potassium hydroxide with thymolphthalein as an indicator. Thus, the acid equivalent is then determined relative to 100 g of rubber.

The carboxylated acrylonitrile-butadiene rubber has several kinds as the ordinary acrylonitrile-butadiene rubber, and according to the containing amounts of acrylonitrile, there are in order the lower amounts, a low nitrile, a middle nitrile, a middle-high nitrile, a high nitrile, and an ultra high nitrile, and taking a heat resistance and an oil resistance into consideration, the middle nitrile, middle-high nitrile, high nitrile are desirable, and preferably 20 to 40% in terms of the amount of containing acrylonitrile.

The foregoing carboxylated acrylonitrile-butadiene rubber having a desired acid equivalent or acrylonitrile content is available also commercially. Nipol DN631 (AN: 33.5) and Nipol 1072 (AN: 27) produced by Nippon Zeon Co., Ltd. may be used by way of example.

The foregoing carboxylated acrylonitrile-butadiene rubber has carbon black incorporated therein as a reinforcing filler.

Specifically, there maybe enumerated SAF (Super Abrasion Furnace black), ISAF (Intermediate Super Abrasion Furnace black), MAF (Medium Abrasion Furnace black), SRF (Semi-Reinforcing Furnace black), GPF (General Purpose Furnace black), FT (Fine Thermal Furnace black), MT (Medium Thermal Furnace black), HAF (High Abrasion Furnace black), and FEF (Fast Extruding Furnace black). For heightening the abrasion resistance, HAF, FEF, GPF and SRF having excellent reinforcing property and form-workability are desirable, and two kinds or more may be combined.

As the white filler, practically, taken up are hydrated silica, clay, talc, calcium carbonate, diatomaceous earth, wollastonite.

Incidentally, carbon black and white filler may be mixed.

The incorporation of carbon black as a reinforcing filler in the rubber composition makes it possible to enhance the abrasion resistance of the lip of the sealing member, resulting in the improvement of sealing properties. The amount of carbon black to be incorporated in the rubber composition is not specifically limited but is preferably from 15 to 80 parts by weight based on 100 parts by weight of the carboxylated acrylonitrile-butadiene rubber. When the amount of carbon black to be incorporated in the rubber composition falls below 15 parts by weight, sufficient reinforcing effect cannot be exerted, providing no satisfactory results. On the contrary, when the amount of carbon black to be incorporated in the rubber composition exceeds 80 parts by weight, no further improvement of reinforcement and abrasion resistance can be recognized. Further, the resulting carboxylated acrylonitrile-butadiene rubber exhibits an extremely deteriorated moldability and thus can difficultly be formed into desired component. Moreover, the resulting carboxylated acrylonitrile-butadiene rubber exhibits too high a hardness and a low elongation and thus loses its inherent rubber elasticity.

In the case where the carboxylated acrylonitrile-butadiene rubber has carbon black and a white filler incorporated therein in combination, the content of carbon black and white filler are preferably from 10 to 70 parts by weight and from 10 to 120 parts by weight, totaling from 20 to 200 parts by weight. When the total content of these additives falls below 20 parts by weight, sufficient reinforcement cannot be provided. On the contrary, when the total content of these additives exceeds 200 parts by weight, no further improvement of reinforcement and abrasion resistance cannot be recognized. Further, the resulting carboxylated acrylonitrile-butadiene rubber exhibits an extremely deteriorated moldability and thus can difficultly be formed into desired component. Moreover, the resulting carboxylated acrylonitrile-butadiene rubber exhibits too high a hardness and a low elongation and thus loses its inherent rubber elasticity.

The carboxylated acrylonitrile-butadiene rubber has a silicone oil incorporated therein as a lubricity providing agent. The kind of the silicone oil to be used herein is not specifically limited. In practice, however, a straight silicone oil, i.e., homopolymer of organic siloxane such as methylsiloxane, dimethylsiloxane, methylphenylsiloxane and trimethylfluoropropylsiloxane, copolymer of two or more of these organosiloxanes or modified silicone oil may be used. The modified silicone oil may contain a compound obtained by substituting some of methyl groups in a straight silicone oil by other lower alkyl, aralkyl or fluorinated alkyl groups or may be a compound modified by substituting by amino group, epoxy group, hydroxyl group, mercapto group, carboxylic acid alkyl group or group obtained by substituting such a hydrocarbon group by halogen. These functional groups react with or are adsorbed by the main chain of carboxylated acrylonitrile-butadiene rubber to prevent the silicone oil from blooming to the surface of the rubber composition at once and gradually and permanently bloom to the surface of the rubber composition, inhibiting the occurrence of poor external appearance of molded product. These silicone oils may be used singly or in combination of two or more thereof.

The silicone oil to be used herein preferably exhibits a dynamic viscosity of from 20 to 100,000 mm$^2$/S at 25° C. When the dynamic viscosity of the silicone oil falls below 20 mm$^2$/S, the resulting carboxylated acrylonitrile-butadiene rubber exhibits insufficient abrasion resistance and abrasion characteristics. On the contrary, when the dynamic viscosity of the silicone oil exceeds 100,000 mm$^2$/S, the resulting carboxylated acrylonitrile-butadiene rubber exhibits deteriorated machinability.

A silicone oil is in the form of liquid and thus can easily bloom to the surface of the rubber composition. Even when used in a small amount, the silicone oil exerts its effect. Accordingly, the amount of silicone oil to be incorporated in the rubber composition is preferably from not smaller than 0.2 parts by weight to less than 30 parts by weight, particularly from 1 to 20 parts by weight based on 100 parts by weight of the carboxylated acrylonitrile-butadiene rubber. When the amount of silicone oil to be incorporated in the rubber composition falls below 0.2 parts by weight, sufficient lubricity cannot be exhibited. On the contrary, when the amount of silicone oil to be incorporated in the rubber composition exceeds 30 parts by weight, maldispersion of additives can occur during machining. Further, the resulting carboxylated acrylonitrile-butadiene rubber exhibits an extremely deteriorated adhesivity to the core metal constituting the sealing member.

The rubber composition may comprise known conventional additives such as vulcanizing agent, vulcanization accelerator, vulcanizing aid, age resistor, reinforcing agent, plasticizer, coupling agent, pigment, dye, release agent, machining aid and electrically conducting agent, abrasion improver and friction improver incorporated therein in a proper amount as necessary.

For example, as the abrasion improver there may be used a polyolefin, spherically particulate carbon or the like. Examples of the polyolefin employable herein include polyethylene, polypropylene, polybutene-1, and poly-4-methylpentene-1. Among these polyolefins, a high density polyethylene is desirable for the improvement of friction characteristics. In order to improve the adhesivity of high density polyethylene to carboxylated acrylonitrile-butadiene rubber and the dispersibility of high density polyethylene in carboxylated acrylonitrile-butadiene rubber, the high density polyethylene may be modified with an unsaturated carboxylic acid or anhydride thereof. When modified with an unsaturated carboxylic acid or anhydride thereof, the polyethylene can be easily adsorbed by various rubbers or oxides due to the carboxyl group in the structure. Further, since the carboxyl group present in the carboxylated acrylonitrile-butadiene rubber has the same effect, the resulting synergistic effect causes further improvement of mechanical properties such as tensile strength and abrasion resistance to advantage. Examples of the unsaturated carboxylic acid or anhydride thereof include unsaturated carboxylic acid such as acrylic acid, methacrylic acid and oleic acid, and unsaturated dicarboxylic acid such as maleic anhydride, itaconic anhydride and citraconic anhydride. One or more of these unsaturated carboxylic acids may be used. In particular, maleic anhydride is preferred.

The amount of the polyolefin to be incorporated is preferably from 5 to 60 parts by weight based on 100 parts by weight of the carboxylated acrylonitrile-butadiene rubber taking into account the abrasion resistance and other physical properties of the rubber material composition. When the amount of the polyolefin to be incorporated falls below 5 parts by weight, the resulting effect of improving abrasion resistance is not sufficient. On the contrary, when the amount of the polyolefin to be incorporated exceeds 60 parts by weight, no further improvement of reinforcement and abrasion resistance can be recognized. Further, the resulting carboxylated acrylonitrile-butadiene rubber exhibits an extremely deteriorated moldability and thus can difficultly be formed into desired component. Moreover, the resulting carboxylated acrylonitrile-butadiene rubber exhibits too high a hardness and a low elongation and thus loses its inherent rubber elasticity.

Further, the globular carbon particle (vitrified carbon, globular graphite) is formed in that phenol formaldehyde resin is carbonized and baked in nitrogen at temperatures of 800 to 2000° C., and the average grain size is around 2 to 40 μm. Practically, Bel-Pearl C (registered trade mark) of Kanebo Co., Ltd. is desirable.

When such globular carbon particles exist on the surface of the rubber material composition, the globular carbon particles receive load, so that the abrasion resistance of the rubber material composition is largely improved. The mixing ratio of the globular carbon particles is not especially limited, but desirably 5 to 40 wt parts for 100 wt parts of the carboxylated acrylonitrile-butadiene rubber.

The lubricant for heightening lubrication will be explained. As the lubricant, a wax (oil and fatty of low melting point) of a melting point being 40 to 140° C. is listed. Actually, falling into the above range of the melting point, there are paraffin wax, micro-crystal wax, polyethylene wax, montan wax, carnauba wax, ester based wax, stearoamide, oxystearo amide, erucylamide, laurylamide, palmitylamide, behenamide, methylolamide, ethylenebisoleylamide, stearyloleylamide. Among them, the polyethylene wax is most desirable. If these lubricants are added 3 to 30 wt parts for 100 wt parts of the carboxylated acrylonitrile-butadiene rubber, the lubrication of the rubber material composition goes up. Being less than 3 parts, the sufficient lubrication cannot be provided, and being more than 30 wt parts, not only the sufficient tensile strength and elongation cannot be obtained and the rubber elasticity goes down, but also the adherence between the core metal and the elastic member composing the sealing member is extremely decreased.

As the friction improver there may be used also a liquid material (lubricant) such as mineral oil, ether-based oil, silicone-based oil, poly-α-olefin oil, fluorine oil and fluorine-based surface active agent. Preferred among these friction improvers is silicone-based oil. A silicone oil is a normally liquid material comprising a polydimethylsiloxane as a main component. The silicone oil is preferably of modified type having a polydimethylsiloxane substituted by amino group, alkyl group, epoxy group, polyether group, higher aliphatic acid ester or the like at some of methyl groups or at terminal thereof. The modification by such a functional group causes the functional group to react with or be adsorbed by the main chain in the carboxylated acrylonitrile-butadiene rubber, making it possible to prevent the oil from blooming to the surface of the rubber composition at once and cause the oil to the surface of the rubber composition gradually and permanently.

Since the lubricant oil is liquid and easy to bloom on the surface of the rubber material composition, the lubricating effect is displayed with an addition smaller than that of the lubricant. If such a lubricant oil is added 1 to 30 wt parts for 100 wt parts of the carboxylated acrylonitrile-butadiene rubber, the lubricity of the rubber material composition is improved. Being less than 1 wt part, the sufficient lubricity is not provided, while being more than 30 wt parts, a poor dispersion of the additive easily occurs during processing the rubber material composition.

The viscosity of the lubricant to be used herein is not specifically defined. Any of commercially available products may be used. In practice, however, a lubricant having a viscosity of from 2 to 10,000 mm$^2$/s at 25° C. is preferred because it can be easily incorporated in the rubber composition.

When there is no mechanism for electrically conducting between the vehicle and the bearing for wheel, electrostatic charge-generated during the running of automobile is left in the vehicle, occasionally producing defectives causing radio noise when the vehicle starts to run. In order to cope with this problem, it has been proposed to electrically conduct the elastic member of the sealing member of the rolling bearing for wheel so that electrical conduction is made across the bearing and the shaft.

The resistivity of the elastic member thus electrically-conducted is not specifically limited but is preferably not greater than $10^5$ Ω·cm as calculated in terms of volume resistivity. When the resistivity of the elastic member falls within this range, radio noise can be sufficiently suppressed. The method for electrically conducting the elastic member is not specifically limited. In practice, however, the rubber composition may comprise an electrically-conductive powder or electrically-conductive fiber incorporated therein. Examples of the electrically-conductive powder employable herein include powder of metal such as brass, aluminum alloy, copper, silver, nickel, steel and stainless steel, powder of electrically-conductive material such as graphite, electrically-conductive carbon black, electrically-conductive tin oxide having tin oxide doped with antimony and electrically-conductive zinc oxide having zinc oxide doped with aluminum, and a powder of insulating material such as mica coated with an electrically-conductive material. Examples of the electrically-conductive fiber employable herein include carbon fiber, metal fiber (fiber made of brass, aluminum alloy, copper, silver, nickel, steel, stainless steel, etc.), and non-conductive fiber coated with an electrically-introducing material.

Among these electrically-conductive powders, an electrically-conductive carbon black having a highly grown graphite structure is desired because it little deteriorates the mechanical properties of the carboxylated acrylonitrile-butadiene rubber or has little effect on the machinability thereof. Among these electrically-conductive carbon blacks, acetylene black and KETJENBLACK are even more desirable because they give excellent electrical conductivity even when used in a small amount. The amount of acetylene black and KETJENBLACK to be added is not specifically limited but is preferably from 2 to 40 parts by weight based on 100 parts by weight of the carboxylated acrylonitrile-butadiene rubber. When the amount of acetylene black and KETJENBLACK to be added falls below 2 parts by weight, sufficient electrical conductivity (volume resistivity of not greater than $10^5$ Ω·cm) cannot be exhibited, providing no satisfactory results in the reduction of radio noise. On the contrary, when the amount of acetylene black and KETJENBLACK to be added exceeds 40 parts by weight, the resulting carboxylated acrylonitrile-butadiene rubber exhibits an extremely deteriorated moldability and thus can difficultly be formed into desired component. Further, the resulting carboxylated acrylonitrile-butadiene rubber exhibits too high a hardness and a low elongation and thus loses its inherent rubber elasticity. Moreover, the use of acetylene black and KETJENBLACK in combination with a so-called electrically-conductive whisker having a fine whisker coated with an electrically-conductive material makes it possible to extremely enhance the electrical conductivity to advantage.

The vulcanization based additives are loaded into the rubber material composition. As the vulcanization based additives, there are a vulcanizing agent (cross linking agent), a vulcanization accelerator, and a vulcanization accelerating assistant.

As the vulcanizing agent (cross linking agent), listed are several kinds of sulfurs such as powder sulfur, flower of sulfur, precipitated sulfur, high dispersion sulfur; sulfur compounds enabling to generate sulfurs as morpholinedisulfide, alkylphenoldisulfide, N,N-dithiobis(hexahydro-2H-azepinon-2), thiurampolysulfide; and peroxides such as dicumyl peroxide, di (t-butylperoxide) diisopropylbenzene, 2, 5-dimethyl-2, 5-di (benzoylperoxy) hexane, benzoylperoxide. Among them, from viewpoint of the dispersion, the easy management, and the heat resistant, it is desirable to use the high dispersion sulfur and morpholinedisulfide.

For using the sulfur based vulcanizing agent, it is necessary to use the vulcanization accelerators such as guanidine based, aldehyde-ammonia based, thiazole based, sulfeneamide based, thiourea based, thiuram based, dithiocarbamate based, zantate based accelerators. Among them, if compounding a bit the high dispersion sulfur, it is desirable to cooperate with thiuram based tetramethylthiuram disulfide, sulfeneamide based N-cyclohexyl-2-benzothiazyl sulfenamide, and thiazole based 2-mercaptobenzothiazol.

As the vulcanization accelerating assistant, there are metallic oxides as zinc oxide, metallic carbonate, metallic hydroxide, fatty acid as stearic acid and derivatives thereof and amines. Since the carboxylated acrylonitrile-butadiene rubber is easy to earlier generate the vulcanization by zinc oxide, a combination of zinc peroxide and stearic acid is preferable. The zinc peroxide exists as it is in the rubber material composition until temperature of kneading and processing the rubber material composition, and generates the zinc oxide when vulcanization-forming, and therefore it does not cause an early vulcanization when kneading and processing and when maintaining.

An organic peroxide-based vulcanizing agent can be used. Examples of the organic peroxide-based vulcanizing agent employable herein include dicumyl peroxide, di-t-butyl peroxide, t-butylcumyl peroxide, benzoyl peroxide, 2,5-dimethyl-2,5-di(t-butylperoxy)hexyne-3,2,5-dimethyl-2,5-di(benzoylperoxy)hexane, 2,5-dimethyl-2,5-di(t-butylperoxy) hexane, 1,3-di(t-butylperoxyisopropyl) benzene, and 2,5-dimethyl(t-butylperoxyisopropyl)benzene. The amount of the organic peroxide-based vulcanizing agent is preferably from 0.5 to 5 parts by weight based on 100 parts by weight of the carboxylated acrylonitrile-butadiene rubber.

In order to improve the compression set of the carboxylated acrylonitrile-butadiene rubber, a crosslinking aid (co-agent) may be used in combination with the organic peroxide-based vulcanizing agent. Examples of the crosslinking aid employable herein include tetrahydrofurfuryl methacrylate, ethylene dimethacrylate, 1,3-butylene dimethacrylate, 1,4-methylene dimethacrylate, 1,6-hexanediol dimethacrylate, polyethylene glycol dimethacrylate, 1,4-butanediol diacrylate, 1,6-hexanediol diacrylate, 2,2'-bis(4-methacryloxydiethoxyphenyl) propane, 2,2'-bis(4-acryloxydiethoxyphenyl)propane, trimethylolpropane triacrylate, trimethylolpropane trimethacrylate, pentaerythritol triacrylate, 3-chloro-2-hydroxypropyl methacrylate, oligoester acrylate, aluminum (meth)acrylate, zinc (meth)acrylate, magnesium (meth)acrylate, calcium (meth)acrylate, triallyl isocyanurate, triallyl cyanurate, triallyl trimellitate, diallyl phthalate, diallyl chlorendate, divinylbenzene, 2-vinylpyridine, N,N'-methylenebisacrylamide, p-quinonedioxim, p,p'-dibenzoylquinonedioxim, and 1,2-polybutadiene. The amount of these crosslinking aids to be incorporated is preferably from 1 to 10 parts by weight based on 100 parts by weight of the carboxylated acrylonitrile-butadiene rubber.

The age resister avoiding oxidizing deterioration will be referred to. As the age resister, enumerated are amine ketone condensation product, aromatic secondary amines, monophenol deviate, bis or polyphenol deviate, hydroquinone deviate, sulfur based age resister, phosphorus based age resister, and a wax such as micro-crystalline wax. Among them, especially preferable are amine ketone condensation product based 2,2,4-trimetyl-1,2-dihydroquindine copolymer, condensation product of diphenylamine and acetone, aromatic secondary amine based N,N'-di-β-naphthyl-p-phenylenediamine, 4,4'-bis (α,α-dimethylbenzil) diphenylamine, N-phenyl-N'-(3-methacryloyloxy-2-hydroxylpropyl)-p-phenylenediamine.

For avoiding heat decomposition and improving the heat resistance, it is more preferable to cooperate a secondary age resister together with the above age resister. The secondary age resister is sulfur based 2-mercaptobenzimidazole, 2-mercaptomethylbenzimidazole, and zinc salts thereof.

As sun-crack preventing agent restraining formation of cracks by the sunlight or ozone, waxes of the melting point being 55 to 70° C. may be added 0.5 to 2 wt parts for 100 wt parts of the carboxylated acrylonitrile-butadiene rubber. Being less than 0.5 wt parts, an effect of preventing ozone cracks is hardly obtained, while being more than 2 wt parts, a problem will occur about the workability since unnecessary waxes bloom on the surface of the rubber material composition.

If a formability should be heightened, a plasticizer as a processing aid is added other than the above additives. Being no matter about the forming, no additives are required. When adding the plasticizer, it is sufficient to add 3 to 20 wt parts for 100 wt parts of the carboxylated acrylonitrile-butadiene rubber, and if the addition is more than a necessary amount, the rubber material composition is softened and at the same time the plasticizer is not completely mixed and might bleed out. Actual examples of the plasticizer are phthalic acid diester as dioctyl phthalate, polyester based plasticizer, polyetherester based plasticizer, and liquid nitrile rubber.

Next reference will be made to the properties of matter. The hardness of the rubber material composition is given influences by the addition amounts of the reinforcing filler or the abrasion improving agent, and from the viewpoint of a sealing property and a following property when applying to the sealing member of the rolling bearings for vehicles, the hardness of the rubber material composition is preferably 50 to 90 in the spring hardness A scale set forth in JIS K6301.

If the hardness is less than 50, the contacting front end is deformed more than necessarily when the sealing member starts rotation. As a result, the abrasion resistance is large when the rolling element is driven, and a smooth rotation is difficult. Being more than 90, the rubber elasticity decreases as mentioned above, and the sealing property and the following property of the contacting front end go down at rotation movement. If using under an environment of much dusts, the life of the rolling element is probably lowered.

The method for obtaining the rubber composition from the foregoing various components is not specifically limited. In practice, however, the carboxylated acrylonitrile-butadiene rubber, carbon black, and optionally silicone oil and other fillers and additives may be uniformly kneaded by means of a known conventional rubber kneader such as rubber kneading roll, pressure kneader and Banbury mixer. The kneading conditions are not specifically limited. In practice, however, these components may be kneaded normally at a temperature of from 30° C. to 80° C., or not lower than the melting point of a polyolefin, if added as a friction improver, for 5 to 60 minutes to allow the various additives to be thoroughly dispersed in the rubber composition.

The method for forming the rubber composition into the elastic member of the sealing member is not specifically limited. In practice, however, an unvulcanized rubber composition may be heated while being heated in a mold. In some detail, a known rubber molding method such as compression molding, transfer molding and injection may be employed. For example, when compression molding is employed, a core metal (which constitutes the core of the sealing member) coated with an adhesive is inserted in the mold. On the core metal is then placed an unvulcanized rubber composition sheet which has been prepared by the previously mentioned method. The unvulcanized rubber composition sheet can be then vulcanized under pressure normally at a temperature of from 120° C. to 250° C. for 3 minutes to 2 hours to prepare the desired elastic member.

The present invention will be further described in the following examples, but the present invention should not be construed as being limited thereto.

EXAMPLES 1–10

Comparative Examples 1–7

Rubber Composition

Raw rubbers, reinforcing fillers and various additives were blended according to the formulation set forth in Table 1A and 1B to prepare rubber compositions.

TABLE 1A

Formulation 1 of examples

| | Example Nos. | | | | | | | | | |
|---|---|---|---|---|---|---|---|---|---|---|
| | 1 | 2 | 3 | 4 | 5 | 6 | 7 | 8 | 9 | 10 |
| Raw rubber A | | | | | | | | | | |
| Raw rubber B | 95 | 95 | 95 | 95 | 95 | | 95 | 95 | 95 | 95 |
| Raw rubber C | | | | | | 95 | | | | |
| Carbon black A | 40 | 50 | 60 | 70 | | 50 | 50 | 50 | 50 | 40 |
| Carbon black B | | | | | 50 | | | | | |
| Silica | | | | | | | | | | |
| Clay | | | | | | | | | | 40 |
| Wollastonite | | | | | | | | | | |
| Vulcanizing agent | 0.5 | 0.5 | 0.5 | 0.5 | 0.5 | 0.5 | 0.5 | 0.5 | 0.5 | 0.5 |
| Vulcanization accelerator A | 0.8 | 0.8 | 0.8 | 0.8 | 0.8 | 0.8 | 0.8 | 0.8 | 0.8 | 0.8 |
| Vulcanization accelerator B | 1.5 | 1.5 | 1.5 | 1.5 | 1.5 | 1.5 | 1.5 | 1.5 | 1.5 | 1.5 |
| Vulcanization accelerator C | 1 | 1 | 1 | 1 | 1 | 1 | 1 | 1 | 1 | 1 |

TABLE 1A-continued

Formulation 1 of examples

| | Example Nos. | | | | | | | | | |
|---|---|---|---|---|---|---|---|---|---|---|
| | 1 | 2 | 3 | 4 | 5 | 6 | 7 | 8 | 9 | 10 |
| Vulcanizing aid A | 1 | 1 | 1 | 1 | 1 | 1 | 1 | 1 | 1 | 1 |
| Vulcanizing aid B | | | | | | | | | | |
| Vulcanizing aid C | 10 | 10 | 10 | 10 | 10 | 10 | 10 | 10 | 10 | 10 |
| Activator | | | | | | | | | | 2 |
| Plasticizer | 5 | 5 | 5 | 5 | 5 | 5 | 5 | 5 | 5 | 5 |
| Abrasion improver | | | | | | | 20 | | 20 | |
| Age resistor A | 1 | 1 | 1 | 1 | 1 | 1 | 1 | 1 | 1 | 1 |
| Age resistor B | 1 | 1 | 1 | 1 | 1 | 1 | 1 | 1 | 1 | 1 |
| Age resistor C | 1 | 1 | 1 | 1 | 1 | 1 | 1 | 1 | 1 | 1 |
| Lubricant | | | | | | | | 5 | 5 | |
| Coupling agent | | | | | | | | | | 2 | unit: parts by weight

TABLE 1B

Formulation 1 of comparative examples

| | Comparative Example Nos. | | | | | | |
|---|---|---|---|---|---|---|---|
| | 1 | 2 | 3 | 4 | 5 | 6 | 7 |
| Raw rubber A | 100 | 100 | 100 | 100 | | | |
| Raw rubber B | | | | | 95 | 95 | |
| Raw rubber C | | | | | | | 95 |
| Carbon black A | 50 | | | | | | |
| Carbon black B | | | | | | | |
| Silica | | 50 | | | 50 | | 50 |
| Clay | | | 100 | | | 100 | |
| Wollastonite | | | | 100 | | | |
| Vulcanizing agent | 0.5 | 0.5 | 0.5 | 0.5 | 0.5 | 0.5 | 0.5 |
| Vulcanization accelerator A | 0.8 | 0.8 | 0.8 | 0.8 | 0.8 | 0.8 | 0.8 |
| Vulcanization accelerator B | 1.5 | 1.5 | 1.5 | 1.5 | 1.5 | 1.5 | 1.5 |
| Vulcanization accelerator C | 1 | 1 | 1 | 1 | 1 | 1 | 1 |
| Vulcanizing aid A | 1 | 1 | 1 | 1 | 1 | 1 | 1 |
| Vulcanizing aid B | 5 | 5 | 5 | 5 | | | |
| Vulcanizing aid C | | | | | 10 | 10 | 10 |
| Activator | | 2 | 2 | 2 | 2 | 2 | 2 |
| Plasticizer | 5 | 5 | 5 | 5 | 5 | 5 | 5 |
| Abrasion improver | | | | | | | |
| Age resistor A | 1 | 1 | 1 | 1 | 1 | 1 | 1 |
| Age resistor B | 1 | 1 | 1 | 1 | 1 | 1 | 1 |
| Age resistor C | 1 | 1 | 1 | 1 | 1 | 1 | 1 |
| Lubricant | | | | | | | |
| Coupling agent | | 2 | 2 | 2 | 2 | 2 | 2 | unit: parts by weight

The various raw rubbers and additives used (described in Table 1A and 1B) will be summarized below.
1) Raw rubber A: middle-high class nitrile rubber (JSR NBR N230S, produced by JSR Co., Ltd.); proportion of acrylonitrile monomer: 35%
2) Raw rubber B: Carboxylated middle-high class nitrile rubber (Nippol DN631, produced by Nippon Zeon Co., Ltd.); proportion of acrylonitrile monomer: 33.5%
3) Raw rubber C: Carboxylated middle class nitrile rubber (Nippol 1072J, produced by Nippon Zeon Co., Ltd.); proportion of acrylonitrile monomer: 27%
4) Carbon black A: HAF class carbon black (Diablack H, produced by Mitsubishi Chemical Corporation)
5) Carbon black B: FEF class carbon black (Asahi 60, produced by Asahi Carbon Co., Ltd.)
6) Silica: Hydrous silica (Nipseal AQ, produced by Nippon Silica Industrial Co., Ltd.)
7) Clay: Kaolin clay (ST-301, produced by Shiraishi Calcium Co., Ltd.)
8) Wollastonite: (NYAD400, produced by NYCO)
9) Vulcanizing agent: High dispersibility sulfur (Sulfax PMC, produced by Tsurumi Chemical Industries, Ltd.)
10) Vulcanization accelerator A: Tetramethyl thiuram disulfide (NOCCELER TT, produced by Ouchi Shinko Kagaku Kogyo K.K.)
11) Vulcanization accelerator B: Tetramethyl thiuram disulfide (NOCCELER TET, produced by Ouchi Shinko Kagaku Kogyo K.K.)
12) Vulcanization accelerator C: N-cyclohexyl-2-benzothiazyl sulphenamide (NOCCELER CZ, produced by Ouchi Shinko Kagaku Kogyo K.K.)
13) Vulcanizing aid A: Stearic acid (Lunac S-35, produced by Kao Corp.)
14) Vulcanizing aid B: Zinc oxide (French Law No. 1, produced by SAKAT CHEMICAL INDUSTRY CO., LTD.)
15) Vulcanizing aid C: Zinc peroxide master batch (Zeonet ZP, produced by Nippon Zeon Co., Ltd.)
16) Activator: Diethylene glycol (produced by NIPPON SHOKUBAI Co., LTD.)
17) Plasticizer; Di-(2-ethylhexyl)phthalate (DOP, produced by Daihachi Chemical Industry Co., Ltd.)
18) Abrasion improver: Carboxyl-modified polyethylene (Modic AP H511, produced by Mitsubishi Chemical corporation)
19) Age resistor A: 4,4-Bis-(α,α-dimethylbenzyl) diphenylamine (NOCRAC CD, produced by Ouchi Sinko Kagaku Kogyo K.K.)
20) Age resistor B: 2-Mercaptobenzimidazole (NOCRAC MB, produced by Ouchi Sinko Kagaku Kogyo K.K.)
21) Age resistor C: Special wax (SUNNOC, produced by Ouchi Sinko Kagaku Kogyo K.K.)
22) Lubricant: Amino-modified silicone oil (KF-860, produced by Shin-Etsu Silicone Co., Ltd.)
23) Coupling agent: γ-Mercaptopropyltrimethoxysilane (KBM803, produced by Shin-Etsu Silicone Co., Ltd,)

Preparation of Test Samples

Test samples were prepared from the foregoing various materials according to the following procedures.

(1) Kneader Kneading Step

Raw rubbers and various additives other than vulcanizing agent and vulcanization accelerator were put in a pressure kneader where they were then kneaded at a predetermined temperature of 80° C. However, when as the abrasion improver there was added a carboxyl-modified polyethylene, the predetermined temperature was changed to 130° C.

(2) Roll Kneading Step

To the material thus kneader-kneaded were then added a vulcanizing agent and a vulcanization accelerator. Using a 6 inch roll, the mixture was then kneaded at a predetermined temperature of 50° C. to make a sheet having a thickness of 2.2 mm. The rotary speed of the various rolls were 20 rpm and 32 rpm, respectively.

(3) Vulcanizing Step (1) Preparation of Sealing Member

A core metal made of cold rolled steel which had been cleaned, coated with an adhesive, and then baked was inserted in a desired sealing member mold. On the core metal was then placed the same unvulcanized rubber sheet as used at the step (2). The material was then heated to a temperature of 170° C. under pressure for 10 minutes to obtain a sealing member (inner diameter; 60 mm) as shown in FIG. 2.

(2) Sheet Forming

On a vulcanizing press which had been heated to a temperature of 170° C. was mounted a sheet vulcanizing mold for thickness of 2 mm. The foregoing unvulcanized rubber sheet was then placed on the sheet vulcanizing mold. The unvulcanized rubber sheet was then heated under pressure for 15 minutes to obtain a vulcanized rubber sheet having a length of 150 mm, a width of 150 mm and a thickness of 2 mm.

Test for Confirming Sealing Properties

Figure 8:
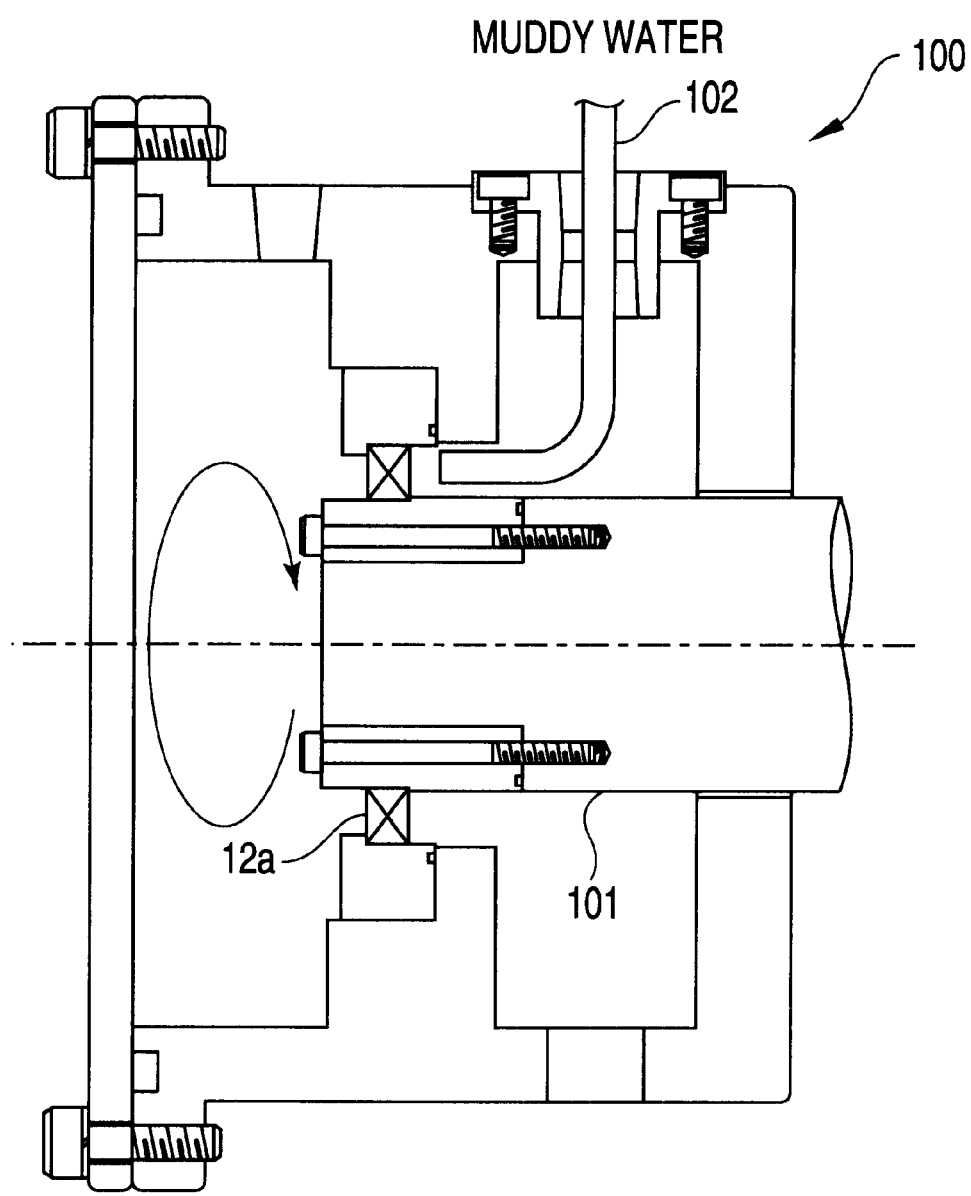
FIG. 8 is a schematic sectional view illustrating a seal rotary testing machine used in a third experiment.

For the test for confirming sealing properties, the sealing member 12a prepared at the foregoing step (1) was mounted on the shaft 101 of the single seal rotary testing machine 100 shown in FIG. 8. Muddy water was the continuously supplied into the sealing member through an intake pipe 102 while the testing machine was being operated at a predetermined rotary speed. The testing conditions were as follows.

Rotary speed; 1,000 rpm
Testing time: 72 hrs
Shaft eccentricity: 0.5 mm TIR
Composition of muddy water: JIS 8 type dust; 10%
Grease: Lithium soap, mineral oil
Coated amount of grease: 1.0 g between outer seal lip and middle seal lip, 0.4 g between middle seal lip and inner seal lip
Injecting conditions: Muddy water was supplied from above the sealing member at a rate of 2 l per minute as shown in FIG. 8
Criterion for judgment; The water content in the grease applied to the gap between the outer seal lip and the inner seal lip was measured by Karl-Fischer method. When the water content was not greater than 0.5%, the sealing properties were then judged excellent and represented by the symbol E. When the water content was not greater than 1%, the sealing properties were then judged good and represented by the symbol G. When the water content was from 2% to 5%, the sealing properties were then judged slightly poor and represented by the symbol F. When the water content was not smaller than 5%, the sealing properties were then judged poor and represented by the symbol P. The results are set forth in Table 2.

Measurement of Physical Properties

The sheet prepared at the foregoing step (2) was measured for dry physical properties. The testing conditions were as follows. The results are set forth in Table 2.

(1) Hardness Test

The sheet was punched into a shape according to JIS 3 test specimen. Three sheets of the test specimen were laminated, and then measured for hardness (A scale of spring hardness) according to JIS K6301.

(2) Tensile Test

The JIS 3 test specimen was subjected to tensile test according to JIS K6301 using a universal testing machine to measure tensile break strength and elongation.

TABLE 2

Sealing properties and dry physical properties of examples and comparative examples

| | Example Nos. | | | | | | | | | | Comparative Example Nos. | | | | | | |
|---|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 | 7 |
| Sealing properties | G | G | G | G | G | G | E | E | E | G | F | P | P | P | P | P | P |
| Hardness | 71 | 74 | 77 | 81 | 72 | 75 | 82 | 72 | 80 | 76 | 70 | 76 | 74 | 71 | 72 | 74 | 76 |
| Tensile strength (MPa) | 28.3 | 29.2 | 27.5 | 31.2 | 26.2 | 29.5 | 31.5 | 27.6 | 29.5 | 25.5 | 24.2 | 16.5 | 13.6 | 12.6 | 18.3 | 14.2 | 19.6 |
| Elongation (%) | 422 | 385 | 370 | 361 | 412 | 393 | 292 | 412 | 306 | 322 | 412 | 526 | 533 | 621 | 562 | 522 | 476 |

As can be seen in the results of FIG. 2, all the examples, which comprise a rubber composition of the invention obtained by blending a carboxylated acrylonitrile-butadiene rubber with at least carbon black, exhibit excellent sealing properties as compared with the comparative examples, which comprise an ordinary uncarboxylated nitrile rubber or comprise a reinforcing filler other than carbon black. As can be seen in the results of Examples 7 to 9, the use of a polyolefin as an abrasion improver and a silicone oil as a lubricant gives a further advantage.

EXAMPLES 11–22

Comparative Examples 8–12

Rubber Composition

Raw rubbers, reinforcing fillers, various additives and electrical conductivity providing agents (electrically-conductive carbon, electrically-conductive whisker) were blended according to the formulation set forth in Table 3A and 3B to prepare rubber compositions.

TABLE 3A

Formulation 2 of examples

| | Example Nos. | | | | | | | | | | | |
|---|---|---|---|---|---|---|---|---|---|---|---|---|
| | 11 | 12 | 13 | 14 | 15 | 16 | 17 | 18 | 19 | 20 | 21 | 22 |
| Raw rubber A | | | | | | | | | | | | |
| Raw rubber B | 95 | 95 | 95 | 95 | 95 | 95 | | 95 | 95 | 95 | 95 | 95 |
| Raw rubber C | | | | | | | 95 | | | | | |
| Carbon black A | 40 | 40 | 40 | 40 | 40 | 40 | 40 | 40 | | 35 | 40 | 40 |
| Electrically-conductive carbon black A | 5 | 10 | 20 | 30 | | | 15 | | 20 | 15 | 15 | 15 |
| Electrically-conductive carbon black B | | | | | 20 | 40 | | | | | | |
| Electrically-conductive whisker | | | | | | | | | 20 | 15 | | |
| Silica | | | | | | | | | 40 | | | |
| Vulcanizing agent | 0.5 | 0.5 | 0.5 | 0.5 | 0.5 | 0.5 | 0.5 | 0.5 | 0.5 | 0.5 | 0.5 | 0.5 |
| Vulcanization accelerator A | 0.8 | 0.8 | 0.8 | 0.8 | 0.8 | 0.8 | 0.8 | 0.8 | 0.8 | 0.8 | 0.8 | 0.8 |
| Vulcanization accelerator B | 1.5 | 1.5 | 1.5 | 1.5 | 1.5 | 1.5 | 1.5 | 1.5 | 1.5 | 1.5 | 1.5 | 1.5 |
| Vulcanization accelerator C | 1 | 1 | 1 | 1 | 1 | 1 | 1 | 1 | 1 | 1 | 1 | 1 |
| Vulcanizing aid A | 1 | 1 | 1 | 1 | 1 | 1 | 1 | 1 | 1 | 1 | 1 | 1 |
| Vulcanizing aid B | | | | | | | | | | | | |
| Vulcanizing aid C | 10 | 10 | 10 | 10 | 10 | 10 | 10 | 10 | 10 | 10 | 10 | 10 |
| Activator | | | | | | | | | 2 | | | |
| Plasticizer | 5 | 5 | 5 | 5 | 5 | 5 | 5 | 5 | 5 | 5 | 5 | 5 |
| Abrasion improver | | | | | | | | | | | | 20 |
| Age resistor A | 1 | 1 | 1 | 1 | 1 | 1 | 1 | 1 | 1 | 1 | 1 | 1 |
| Age resistor B | 1 | 1 | 1 | 1 | 1 | 1 | 1 | 1 | 1 | 1 | 1 | 1 |
| Age resistor C | 1 | 1 | 1 | 1 | 1 | 1 | 1 | 1 | 1 | 1 | 1 | 1 |
| Lubricant | | | | | | | | | | | 5 | |
| Coupling agent | | | | | | | | | 2 | | | |

Unit: parts by weight

TABLE 3B

Formulation 2 of comparative examples

| | Comparative Example Nos. | | | | |
|---|---|---|---|---|---|
| | 8 | 9 | 10 | 11 | 12 |
| Raw rubber A | 100 | 100 | 100 | | |
| Raw rubber B | | | | 95 | 95 |
| Raw rubber C | | | | | |
| Carbon black A | 40 | 40 | | 40 | |
| Electrically-conductive carbon black A | | 15 | 15 | 1 | |
| Electrically-conductive carbon black B | | | | | |
| Electrically-conductive whisker | | | | | 20 |
| Silica | | | 40 | | 40 |
| Vulcanizing agent | 0.5 | 0.5 | 0.5 | 0.5 | 0.5 |
| Vulcanization accelerator A | 0.8 | 0.8 | 0.8 | 0.8 | 0.8 |
| Vulcanization accelerator B | 1.5 | 1.5 | 1.5 | 1.5 | 1.5 |
| Vulcanization accelerator C | 1 | 1 | 1 | 1 | 1 |
| Vulcanizing aid A | 1 | 1 | 1 | 1 | 1 |
| Vulcanizing aid B | 5 | 5 | 5 | | |
| Vulcanizing aid C | | | | 10 | 10 |
| Activator | | | | 2 | | 2 |
| Plasticizer | 5 | 5 | 5 | 5 | 5 |
| Abrasion improver | | | | | |
| Age resistor A | 1 | 1 | 1 | 1 | 1 |
| Age resistor B | 1 | 1 | 1 | 1 | 1 |
| Age resistor C | 1 | 1 | 1 | 1 | 1 |
| Lubricant | | | | | |
| Coupling agent | | | 2 | | 2 |

Unit: parts by weight

As the raw rubbers, reinforcing fillers and various additives there were used the same materials as used in the preparation of the rubber compositions of Examples 1 to 10 and Comparative Examples 1 to 7. The electrical conductivity providing agents used are as follows.

24) Electrically-conductive carbon black A: (KETJENBLACK EC-600JD, produced by KETJENBLACK International Co., Ltd.)

25) Electrically-conductive carbon black B: Acetylene black (Denka Black, produced by DENKI KAGAKU KOGYO K.K.)

26) Electrically-conductive whisker: Electrically-conductive potassium titanate whisker (DENTALL BK, produced by Otsuka Chemical Co., Ltd.)

Preparation of Test Samples

Test sealing members and sheets were prepared in the same manner as used in Examples 1 to 10 and Comparative Examples 1 to 7.

Test for Confirming Sealing Properties and Measurement of Physical Properties

The test samples were each then subjected to test for confirming sealing properties and measurement for dry physical properties in the same manner as used in Examples 1 to 10 and Comparative Examples 1 to 7. The results are set forth in Table 4.

Electrical Conductivity Test

The sheets thus prepared were each measured for volume resistivity according to SRIS 2301. When the volume resistivity is not higher than $10^5$ $\Omega \cdot cm$, the test specimen is judged acceptable. The measurements are set forth in Table 4.

TABLE 4

Resistivity, sealing properties and dry physical properties of examples and comparative example

| | Example Nos. | | | | | | | | | | | |
|---|---|---|---|---|---|---|---|---|---|---|---|---|
| | 11 | 12 | 13 | 14 | 15 | 16 | 17 | 18 | 19 | 20 | 21 | 22 |
| Seal resistivity (kΩ) | 95 | 70 | 41 | 12 | 75 | 62 | 64 | 52 | 60 | 27 | 63 | 66 |
| Volume resistivity (Ω·cm) | $7.1 \times 10^1$ | $4.0 \times 10^3$ | $2.5 \times 10^2$ | $1.3 \times 10$ | $6.2 \times 10^4$ | $1.6 \times 10^3$ | $2.3 \times 10^3$ | $7.6 \times 10^2$ | $2.2 \times 10^3$ | $4.6 \times 10$ | $4.3 \times 10^3$ | $4.1 \times 10^3$ |
| Sealing properties | G | G | G | G | G | G | G | G | G | G | E | E |
| Hardness | 71 | 74 | 79 | 83 | 76 | 81 | 77 | 79 | 83 | 77 | 76 | 84 |
| Tensile strength (MPa) | 26.2 | 28.5 | 27.6 | 31.2 | 26.5 | 32.5 | 28.8 | 25.2 | 21.7 | 26.8 | 29.8 | 29.5 |
| Elongation(%) | 421 | 402 | 360 | 245 | 281 | 216 | 223 | 242 | 315 | 303 | 230 | 241 |

| | Comparative Example Nos. | | | | |
|---|---|---|---|---|---|
| | 8 | 9 | 10 | 11 | 12 |
| Seal resistivity (kΩ) | — | 60 | 69 | 320 | 54 |
| Volume resistivity (Ω·cm) | $4.2 \times 10^{14}$ | $4.2 \times 10^3$ | $8.3 \times 10^3$ | $3.8 \times 10^6$ | $1.2 \times 10^3$ |
| Sealing properties | F | F | P | G | P |
| Hardness | 68 | 74 | 75 | 72 | 78 |
| Tensile strength (MPa) | 24.2 | 27.7 | 22.6 | 26.1 | 29.3 |
| Elongation (%) | 431 | 306 | 340 | 399 | 422 |

As can be seen in the results of Table 4, the addition of an electrical conductivity providing agent to a basic composition having carbon black incorporated in a carboxylated acrylonitrile-butadiene rubber in an amount defined herein makes it possible to provide a good electrical conductivity while maintaining desired sealing properties and physical properties.

The present invention will be further described in the following examples, but the present invention should not be construed as being limited thereto.

EXAMPLES 1–9

Comparative Examples 1–15

Rubber Composition

Raw rubbers, carbon black, silicone oil and various additives were blended according to the formulation set forth in Tables 5 and 6 to prepare rubber compositions.

TABLE 5

Formulation of examples

| | Example Nos. | | | | | | | | |
|---|---|---|---|---|---|---|---|---|---|
| | 1 | 2 | 3 | 4 | 5 | 6 | 7 | 8 | 9 |
| Raw rubber A | | | | | | | | | |
| Raw rubber B | 95 | 95 | 95 | | 95 | 95 | 95 | 95 | 95 |
| Raw rubber C | | | | 95 | | | | | |
| Raw rubber D | | | | | | | | | |
| Raw rubber E | | | | | | | | | |
| Carbon black A | 50 | | 50 | 50 | 40 | 60 | 40 | 50 | 50 |
| Carbon black B | | 50 | | | | | | | |
| Carbon black C | | | | | | | | | |
| Silica | | | | | | | | | |
| Clay | | | | | | | 40 | | |
| Wollastonite | | | | | | | | | |
| Sulfur | 0.5 | 0.5 | 0.5 | 0.5 | 0.5 | 0.5 | 0.5 | 0.5 | |
| Organic peroxide | | | | | | | | | 4 |
| TT | 0.8 | 0.8 | 0.8 | 0.8 | 0.8 | 0.8 | 0.8 | 0.8 | |
| TET | 1.5 | 1.5 | 1.5 | 1.5 | 1.5 | 1.5 | 1.5 | 1.5 | |
| CZ | 1 | 1 | 1 | 1 | 1 | 1 | 1 | 1 | |
| Stearic acid | 1 | 1 | 1 | 1 | 1 | 1 | 1 | 1 | 1 |
| Zinc white | | | | | | | | | |
| Zinc peroxide master batch | 10 | 10 | 10 | 10 | 10 | 10 | 10 | 10 | 10 |
| Diethylene glycol | | | | | | | 2 | | |
| DOP | 5 | 5 | 5 | 5 | 5 | 5 | 5 | 5 | 5 |
| Modified polyethylene | | | | | | | | 20 | |
| CD | 1 | 1 | 1 | 1 | 1 | 1 | 1 | 1 | 1 |
| MB | 1 | 1 | 1 | 1 | 1 | 1 | 1 | 1 | 1 |
| Special wax | 1 | 1 | 1 | 1 | 1 | 1 | 1 | 1 | 1 |
| Mineral oil | | | | | | | | | |
| PAO | | | | | | | | | |
| Ether oil | | | | | | | | | |
| Silicone oil | 5 | 5 | | | | | | | |
| Modified silicone oil | | | 5 | 5 | 5 | 5 | 5 | 5 | 5 |
| Fluorine oil | | | | | | | | | |
| Paraffin wax | | | | | | | | | |
| Polyethylene wax | | | | | | | | | |
| Stearic acid amid | | | | | | | | | |
| Coupling agent | | | | | | | 3 | | |
| TAIC | | | | | | | | | |

Unit: parts by weight

TABLE 6

Formulation of comparative examples

| | Comparative Example Nos. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Raw rubber A | 100 | 100 | | | | | | | | | | | | | |
| Raw rubber B | | | | | 95 | 95 | 95 | 95 | 95 | 95 | 95 | 95 | 95 | 95 | 95 |
| Raw rubber C | | | | | | | | | | | | | | | |
| Raw rubber D | | | 100 | | | | | | | | | | | | |
| Raw rubber E | | | | 100 | | | | | | | | | | | |
| Carbon black A | 50 | 50 | 50 | | 50 | 50 | 50 | 50 | 50 | 50 | 50 | 50 | | | |
| Carbon black B | | | | | | | | | | | | | | | |
| Carbon black C | | | | 30 | | | | | | | | | | | |
| Silica | | | | | | | | | | | | | 50 | | |
| Clay | | | | | | | | | | | | | | 100 | |
| Wollastonite | | | | | | | | | | | | | | | 100 |
| Sulfur | 0.5 | 0.5 | | | 0.5 | 0.5 | 0.5 | 0.5 | 0.5 | 0.5 | 0.5 | 0.5 | 0.5 | 0.5 | 0.5 |
| Organic peroxide | | | 8 | 3 | | | | | | | | | | | |
| TT | 0.8 | 0.8 | | | 0.8 | 0.8 | 0.8 | 0.8 | 0.8 | 0.8 | 0.8 | 0.8 | 0.8 | 0.8 | 0.8 |
| TET | 1.5 | 1.5 | | | 1.5 | 1.5 | 1.5 | 1.5 | 1.5 | 1.5 | 1.5 | 1.5 | 1.5 | 1.5 | 1.5 |
| CZ | 1 | 1 | | | 1 | 1 | 1 | 1 | 1 | 1 | 1 | 1 | 1 | 1 | 1 |
| Stearic acid | 1 | 1 | | | 1 | 1 | 1 | 1 | 1 | 1 | 1 | 1 | 1 | 1 | 1 |
| Zinc white | 5 | 5 | | | | | | | | | | | | | |
| Zinc peroxide master batch | | | | | 10 | 10 | 10 | 10 | 10 | 10 | 10 | 10 | 10 | 10 | 10 |
| Diethylene glycol | | | | | | | | | | | | | 2 | 2 | 2 |

TABLE 6-continued

Formulation of comparative examples

| | Comparative Example Nos. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| DOP | 5 | 5 | 5 | | 5 | 5 | 5 | 5 | 5 | 5 | 5 | 5 | 5 | 5 | 5 |
| Modified polyethlene | | | | | | | | | | | | | | | |
| CD | 1 | 1 | 1 | | 1 | 1 | 1 | 1 | 1 | 1 | 1 | 1 | 1 | 1 | 1 |
| MB | 1 | 1 | 1 | | 1 | 1 | 1 | 1 | 1 | 1 | 1 | 1 | 1 | 1 | 1 |
| Special wax | 1 | 1 | 1 | | 1 | 1 | 1 | 1 | 1 | 1 | 1 | 1 | 1 | 1 | 1 |
| Mineral oil | | | | | | 10 | | | | | | | | | |
| PAO | | | | | | | 10 | | | | | | | | |
| Ether oil | | | | | | | | 10 | | | | | | | |
| Silicone oil | | | | 5 | | | | | | | | | | | |
| Modified silicone oil | | 5 | 5 | | | | | | | | | | 5 | 5 | 5 |
| Fluorine oil | | | | | | | | | 10 | | | | | | |
| Paraffin wax | | | | | | | | | | 10 | | | | | |
| Polyethylene wax | | | | | | | | | | | 10 | | | | |
| Stearic acid amide | | | | | | | | | | | | 10 | | | |
| Coupling agent | | | | | | | | | | | | | | 3 | 3 | 3 |
| TAIC | | | | | 4 | | | | | | | | | | |

Unit: parts by weight

The various raw rubbers, carbon black, silicone oil and additives used will be summarized below.
1) Raw rubber A: middle-high class nitrile rubber (JSR NBR N230S, produced by JSR Co., Ltd.); proportion of acrylonitrile monomer: 35%
2) Raw rubber B: Carboxylated middle-high class nitrile rubber (Nippol DN631, produced by Nippon Zeon Co., Ltd.); proportion of acrylonitrile monomer: 33.5%
3) Raw rubber C: Carboxylated middle class nitrile rubber (Nippol 1072J, produced by Nippon Zeon Co., Ltd.); proportion of acrylonitrile monomer: 27%
4) Raw rubber D: Hydrogenated middle-high class nitrile rubber (Zetpol 2020, produced by Nippon Zeon Co., Ltd.); proportion of acrylonitrile monomer: 36%
5) Raw rubber E: Fluororubber (Diel G-801, produced by DAIKIN INDUSTRIES, LTD.)
6) Carbon black A: HAF class carbon black (Diablack H, produced by Mitsubishi Chemical Corporation)
7) Carbon black B: SRF class carbon black (Asahi 70, produced by Asahi Carbon Co., Ltd.)
8) Carbon black C: MT class carbon black (Themax N-990, produced by Cancarb Inc.)
9) Silica: Hydrous silica (Nipseal AQ, produced by Nippon Silica Industrial Co., Ltd.)
10) Clay: Kaolin clay (ST-301, produced by Shiraishi Calcium Co., Ltd.)
11) Wollastonite: (NYAD400, produced by NYCO)
12) Sulfur: High dispersibility sulfur (Sulfax PMC, produced by Tsurumi chemical Industries, Ltd.)
13) Organic peroxide: 2,5-Dimethyl(t-butylperoxyisopropyl) benzene (Peroximon PF-40, produced by NOF Corp.)
14) TT: Tetramethyl thiuram disulfide (NOCCELER TT, produced by Ouchi Shinko Kagaku Kogyo K.K.)
15) TET: Tetramethyl thiuram disulfide (NOCCELER TET, produced by Ouchi Shinko Kagaku Kogyo K.K.)
16) CZ: N-cyclohexyl-2-benzothiazole sulfenamide (NOCCELER CZ, produced by Ouchi Shinko Kagaku Kogyo K.K.)
17) Stearic acid: (Lunac S-35, produced by Kao Corp.)
18) Zinc white: zinc oxide (French Law No. 1, produced by SAKAI CHEMICAL INDUSTRY CO., LTD.)
19) Zinc peroxide master batch: (Zeonet ZP, produced by Nippon Zeon Co., Ltd.)
20) Diethylene glycol: (produced by NIPPON SHOKUBAI CO., LTD.)
21) DOP: Plasticizer; Di-(2-ethylhexyl)phthalate (DOP, produced by Daihachi Chemical Industry Co., Ltd.)
22) Modified polyethylene: Carboxyl-modified polyethylene (Modic AP H511, produced by Mitsubishi Chemical corporation)
23) CD: Age resistor; 4,4-Bis-(α,α-dimethylbenzyl) diphenylamine (NOCRAC CD, produced by Ouchi Sinko Kagaku Kogyo K.K.)
24) MB: Age resistor: 2-Mercaptobenzimidazole (NOCRAC MB, produced by Ouchi Sinko Kagaku Kogyo K.K.)
25) Special wax: Age resistor (SUNNOC, produced by Ouchi Sinko Kagaku Kogyo K.K.)
26) Mineral oil: Lubricant No. 1 for JIS test (produced by NIPPON OIL CO., LTD.)
27) PAO: Poly-α-olefin (SHO629, produced by Exxon Mobil Co., Ltd.)
28) Ether oil; (MORESCO-HILIBE LBX-100, produced by Matsumura Oil Research Corp.)
29) Silicone oil: Straight silicone oil (KF86, produced by Shin-Etsu Silicone Co., Ltd.)
30) Modified silicone oil; Amino-modified silicone oil (KF-860, produced by Shin-Etsu Silicone Co., Ltd.)
31) Fluorine oil: (DEMNUM S-100, produced by DAIKIN INDUSTRIES, LTD.)
32) Paraffin wax: (NHP-9, produced by Nippon Seiro Co., Ltd.)

33) Polyethylene wax: (Mitsui Highwax 320P, produced by Mitsui Chemical Corporation)
34) Stearic acid amide: (Divide 200, produced by Nippon Kasei Chemical Co., Ltd.)
35) Coupling agent: γ-Mercaptopropyltrimethoxysilane (KBM803, produced by Shin-Etsu Silicone Co., Ltd.)
36) TAIC: Triallyl isocyanate (produced by Nippon Kasei Chemical Co., Ltd.)

First Experiment

The foregoing various materials were kneaded according to the formulation set forth in Table 1 using a pressure kneader and a kneading roll to prepare an unvulcanized rubber sheet having a thickness of 2.2 mm. Subsequently, the unvulcanized rubber sheet thus prepared was inserted in a mold having a length of 150 mm and a thickness of 2 mm. The unvulcanized rubber sheet was then subjected to vulcanization under a pressure of 50 kgf/cm$^2$ under the vulcanization conditions-set forth in Tables 3 and 4. For Example 9 and Comparative Example 1, which were subjected to vulcanization with peroxide, and Comparative Example 4, which comprised fluororubber, the material was withdrawn from the mold, and then subjected to vulcanization in an oven under the secondary vulcanization conditions set forth in these tables. The vulcanized rubber sheets thus obtained were each then subjected to the following tests.

(1) Hardness Test

The vulcanized rubber sheet was punched into a shape according to JIS dumbbell No. 3 specimen. Three sheets of the test specimen were laminated, and then measured for hardness (A scale of spring hardness) according to JIS K6301.

(2) Tensile Test

The JIS dumbbell No. 3 test specimen was subjected to tensile test according to JIS K6301 using Autograph AG-10KNG (produced by Shimadzu Corp.) as a universal testing machine to measure tensile break strength and elongation.

(3) Abrasion/Friction Test

Using a Type FEM-III-E abrasion/friction testing machine produced by Orientech Co., Ltd.), the test specimen was subjected to abrasion/friction test according to JIS K7218 plastic slide abrasion testing method A. The abrasion depth was calculated from the measurement of the surface shape of the specimen before and after testing. For the highest temperature and friction coefficient of the opposing material during testing, the values measured shortly before termination of testing were recorded. The testing conditions will be described below.

Sliding rate: 1 m/sec
Face pressure: 0.15 MPa
Opposing material: SUJ2
Surface roughness of opposing material: 0.4 μmRa
Hardness of opposing material; HRC56-62
Testing time: 24 hours The results are set forth in Tables 7 and 8. All the examples which comprise a rubber composition having carbon black and silicone oil incorporated in a carboxylated acrylonitrile-butadiene rubber exhibit excellent abrasion resistance and frictional characteristics and generate less heat as compared with the comparative examples which comprise an ordinary uncarboxylated nitrile rubber, hydrogenated nitrile rubber and fluororubber, the comparative examples which are free of carbon black and the comparative examples which comprise a lubricity providing agent other than silicone oil. The comparison of the examples shows that Example 3, which comprises a modified silicone oil, exhibits a low friction coefficient than Example 1, which comprises a straight silicone oil. It is also made obvious that Example 1,. which comprises an HAF class carbon black, exhibits a less abrasion than Example 2, which comprises an SRF class carbon black. It is further made obvious that Example 8, which comprises a polyolefin incorporated therein as an abrasion improver, exhibits lowest abrasion.

Second Experiment

Figure 6:
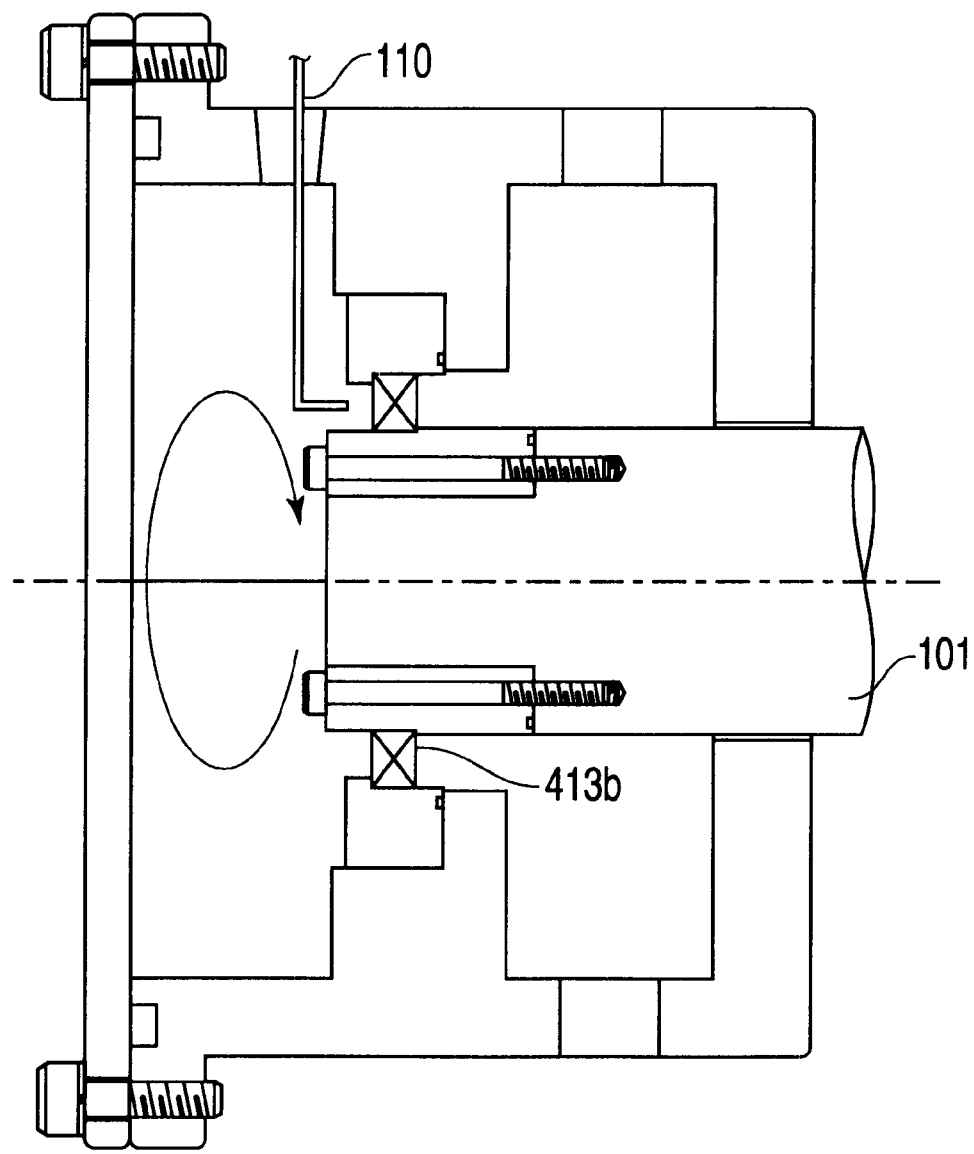
FIG. 6 is a schematic sectional view illustrating a seal rotary testing machine used in a second experiment.

An oil seal having a shaft diameter of 165 mm having the same shape as that of the oil seal 413b of the sealing member of the rolling bearing for bearing the wheel of railway vehicle shown in FIG. 5 was prepared. In some detail, in a seal mold having a shape corresponding to the dust lip 413e and the main lip 413f was inserted a reinforcing ring 413d made of cold rolled steel which had been cleaned, coated with an adhesive, and then baked. On the reinforcing ring 413d was then placed the same unvulcanized rubber sheet as used in the first experiment. The material was then subjected to vulcanization under a pressure of 30 kgf/cm$^2$ under the same vulcanization conditions as used in the first experiment. Subsequently, using a seal rotary testing machine shown in FIG. 6, testing was conducted on the supposition that lubricant has run out. In the operation of the seal rotary testing machine shown, the shaft 101 is rotated at a predetermined rotary speed with the oil seal 413b mounted thereon. The temperature of the main lip during rotation is measured by a thermocouple 110 disposed at a distance of 1 mm from the tip of the main lip 413f. The properties measured are abrasion of main lip 413f, rotary torque and temperature of heat generated. The measuring conditions were as follows.

Rotary speed: 2,000 rpm
Testing time: 10 hrs
Testing temperature: Room temperature
Shaft eccentricity: 0.1 mm TIR
Lubricant: None For the determination of abrasion of the main lip 413f, the shape of the main lip 413f was measured before and after testing. The resulting area loss was then determined relative to that of Example 1 as 100. The temperature of heat generated is represented by its highest value. The torque is represented by its stabilized value measured 1 hour after the beginning of testing.

The results are set forth in Tables 3 and 4. All the examples which comprise a rubber composition having silicone oil incorporated in a carboxylated acrylonitrile-butadiene rubber exhibit excellent abrasion resistance of main lip and torque and generate less heat as compared with the comparative examples which comprise an ordinary uncarboxylated nitrite rubber, hydrogenated nitrile rubber and fluororubber, the comparative examples which are free of carbon black and the comparative examples which comprise a lubricity providing agent other than silicone oil. The comparison of the examples shows that Example 3, which comprises a modified silicone oil, exhibits a low friction coefficient than Example 1, which comprises a straight silicone oil. It is also made obvious that Example 1, which comprises an HAF class carbon black, exhibits a less abrasion of main lip than Example 2, which comprises an SRF class carbon black. It is further made obvious that Example 8, which comprises a polyolefin incorporated therein as an abrasion improver, exhibits lowest abrasion of main lip.

Third Experiment

Figure 7:
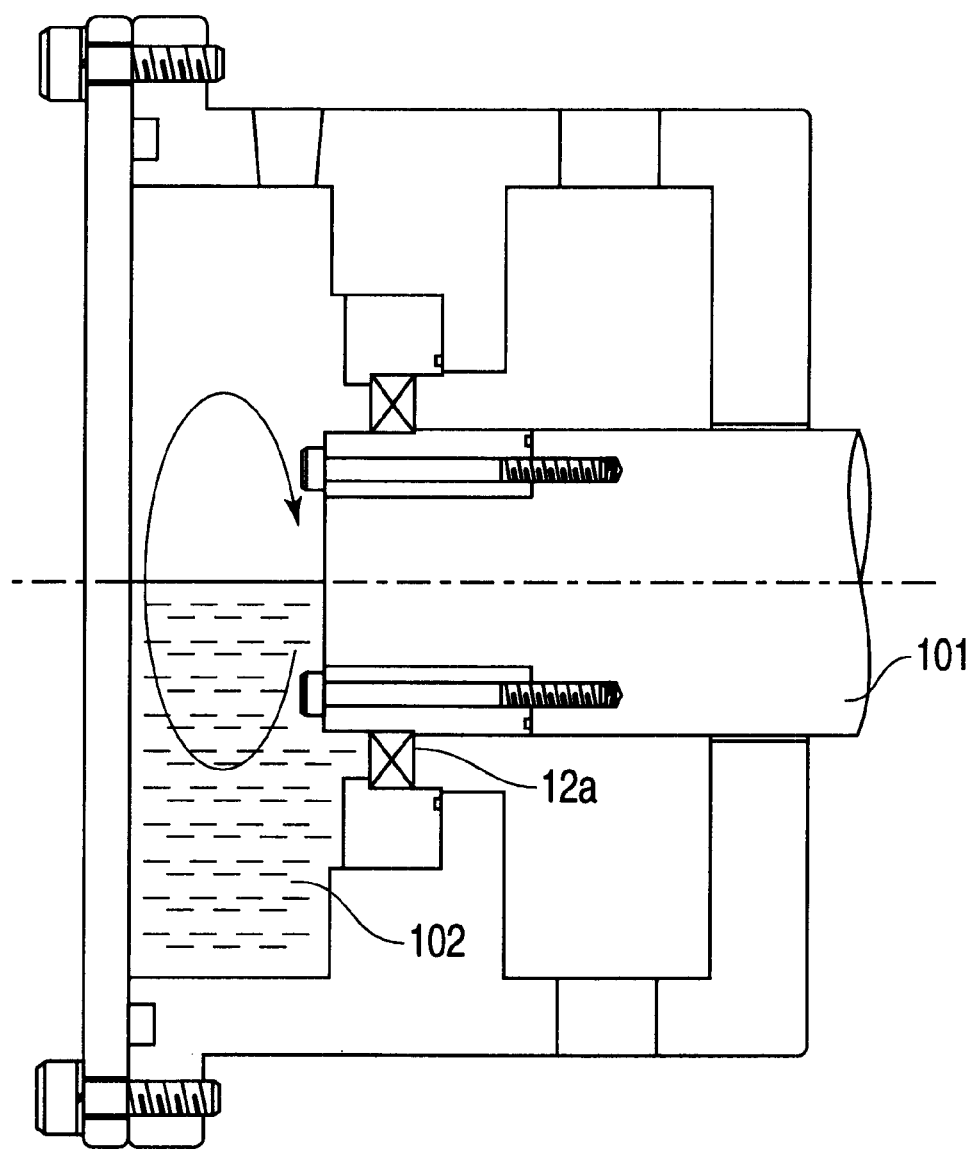
FIG. 7 is a schematic sectional view illustrating a seal rotary testing machine used in a third experiment.

A sealing member having an inner diameter of 60 mm having the same shape as that of the sealing member 12a of the rolling bearing for bearing the wheel of railway vehicle shown in FIG. 5 was prepared. In some detail, in a seal mold was inserted a core metal 105 made of cold rolled steel which had been cleaned, coated with an adhesive, and then baked. On the core metal was then placed the same unvulcanized rubber sheet as used in the first experiment. The material was then subjected to vulcanization under a pressure of 30 kgf/cm$^2$ under the same vulcanization conditions as used in the first experiment. Subsequently, using a seal rotary testing machine shown in FIG. 7, testing was conducted on the supposition that the test specimen is dipped in muddy water. In the operation of the seal rotary testing machine shown, the shaft 101 is rotated at a predetermined rotary speed with the sealing 12a provided with a slinger 106 (see FIG. 2) mounted thereon while being dipped in muddy water 102 stored therein. The measuring conditions were as follows.

Rotary speed: 800 rpm

Testing time; 48 hrs

Shaft eccentricity; 0.5 mm TIR

Composition of muddy water: JIS 8 type dust; 10%

Grease: Lithium soaps mineral oil

Coated amount of grease: 1.0 g between outer seal lip and middle seal lip, 0.4 g between middle seal lip and inner seal lip Criterion for judgment: The water content in the grease applied to the gap between the outer seal lip and the inner seal lip was measured by Karl Fischer method. When the water content was not greater than 0.5%, the sealing properties were then judged excellent and represented by the symbol E. When the water content was not greater than 1%, the sealing properties were then judged good and represented by the symbol G. When the water content was from 2% to 5%, the sealing properties were then judged slightly poor and represented by the symbol F. When the water content was not smaller than 5%, the sealing properties were then judged poor and represented by the symbol P. The results are set forth in Tables 7 and 8.

TABLE 7

Results of test on examples

| | | Example Nos. | | | | | | | | |
|---|---|---|---|---|---|---|---|---|---|---|
| | | 1 | 2 | 3 | 4 | 5 | 6 | 7 | 8 | 9 |
| Vulcanizing conditions | Primary vulcanization (° C. × min) | 170 × 20 | 170 × 20 | 170 × 20 | 170 × 20 | 170 × 20 | 170 × 20 | 170 × 20 | 170 × 20 | 170 × 20 |
| | Secondary vulcanization (° C. × h) | | | | | | | | | 120 × 20 |
| Dry physical properties | Hardness | 72 | 70 | 73 | 74 | 69 | 74 | 74 | 81 | 75 |
| | Tensile strength (MPa) | 27.6 | 27.2 | 28.5 | 31.2 | 26.5 | 29.2 | 24.3 | 31.5 | 30.3 |
| | Elongation (%) | 412 | 431 | 396 | 364 | 457 | 352 | 356 | 292 | 313 |
| First experiment | Abrasion depth (μm) | 21 | 27 | 16 | 17 | 20 | 14 | 20 | 6 | 10 |
| | Dynamic abrasion coefficient | 0.52 | 0.5 | 0.43 | 0.44 | 0.53 | 0.41 | 0.47 | 0.53 | 0.55 |
| | Temperature (° C.) | 90 | 88 | 81 | 81 | 87 | 80 | 84 | 90 | 92 |
| Second experiment | Abrasion | 100 | 135 | 85 | 73 | 140 | 71 | 132 | 41 | 55 |
| | Torque (N · m) | 1.8 | 1.9 | 1.7 | 1.7 | 1.6 | 1.7 | 1.7 | 1.9 | 1.8 |
| | Temperature (° C.) | 73 | 75 | 70 | 68 | 65 | 67 | 67 | 73 | 72 |
| Third experiment | Sealing properties | G | G | E | E | G | E | G | E | G |

TABLE 8

Results of test on comparative examples

| | | Comparative example Nos. | | | | | | | | | |
|---|---|---|---|---|---|---|---|---|---|---|---|
| | | 1 | 2 | 3 | 4 | 5 | 6 | 7 | 8 | 9 | 10 |
| Vulcanizing conditions | Primary vulcanization (° C. × min) | 170 × 20 | 170 × 20 | 170 × 20 | 170 × 20 | 170 × 20 | 170 × 20 | 170 × 20 | 170 × 20 | 170 × 20 | 170 × 20 |
| | Secondary vulcanization (° C. × h) | | | 130 × 2 | 200 × 4 | | | | | | |
| Dry physical properties | Hardness | 70 | 68 | 78 | 79 | 71 | 68 | 67 | 68 | 68 | 72 |
| | Tensile strength (MPa) | 24.2 | 23.1 | 29.7 | 16.2 | 28.3 | 25.2 | 24.4 | 26 | 26.2 | 24.6 |
| | Elongation (%) | 422 | 441 | 291 | 175 | 422 | 432 | 427 | 411 | 441 | 380 |
| First experiment | Abrasion depth ($\mu$m) | 73 | 48 | 54 | 82 | 45 | 62 | 78 | 83 | 70 | 79 |
| | Dynamic abrasion | 0.8 | 0.62 | 0.67 | 1.13 | 0.7 | 0.73 | 0.82 | 0.81 | 0.77 | 0.78 |
| | Temperature (° C.) | 118 | 103 | 110 | 172 | 110 | 112 | 131 | 125 | 122 | 121 |
| Second experiment | Abrasion | 791 | 385 | 442 | 591 | 227 | 525 | 822 | 765 | 634 | 692 |
| | Torque (N · m) | 2.6 | 2.3 | 2.8 | 3.8 | 2.7 | 2.7 | 3.2 | 3.2 | 3.1 | 3 |
| | Temperature (° C.) | 112 | 88 | 93 | 133 | 93 | 102 | 110 | 111 | 108 | 103 |
| Third experiment | Sealing properties | P | F | F | P | F | P | P | P | P | P |

| | | Comparative example Nos. | | | | |
|---|---|---|---|---|---|---|
| | | 11 | 12 | 13 | 14 | 15 |
| Vulcanizing conditions | Primary vulcanization (° C. × min) | 170 × 20 | 170 × 20 | 170 × 20 | 170 × 20 | 170 × 20 |
| | Secondary vulcanization (° C. × h) | | | | | |
| Dry physical properties | Hardness | 73 | 72 | 73 | 72 | 70 |
| | Tensile strength (MPa) | 23.1 | 22.4 | 14.5 | 13.2 | 12.4 |
| | Elongation (%) | 348 | 332 | 532 | 545 | 622 |
| First experiment | Abrasion depth ($\mu$m) | 84 | 80 | 342 | 831 | 241 |
| | Dynamic abrasion | 0.89 | 0.86 | 1.21 | 1.1 | 1.25 |
| | Temperature (° C.) | 130 | 124 | 173 | 169 | 175 |
| Second experiment | Abrasion | 721 | 695 | 3000↑ | 3000↑ | 3000↑ |
| | Torque (N · m) | 3.3 | 3.2 | 4.2 | 4.1 | 3.9 |
| | Temperature (° C.) | 115 | 109 | 152 | 148 | 145 |
| Third experiment | Sealing properties | P | P | P | P | P |

As can be seen in Tables 7 and 8, all the examples which comprise a rubber composition having silicone oil incorporated in a carboxylated acrylonitrile-butadiene rubber exhibit excellent sealing properties as compared with the comparative examples which comprise an ordinary uncarboxylated nitrile rubber, hydrogenated nitrile rubber and fluororubber, the comparative examples which are free of carbon black and the comparative examples which comprise a lubricity providing agent other than silicone oil. The comparison of the examples shows that Examples 3, 4, 6 and 8, which comprise a modified silicone oil, exhibit better sealing properties than Examples 1 and 2, which comprise a straight silicone oil. It is also made obvious that Example 8, which comprises a polyolefin incorporated therein as an abrasion improver, exhibits the best sealing properties.

As mentioned above, the rolling bearing according to the invention comprises a sealing member comprising an elastic member formed by a vulcanizable rubber composition obtained by blending a carboxylated acrylonitrile-butadiene rubber with at least carbon black as a filler and thus exhibits excellent sealing properties of sealing member and can maintain desired properties over an extended period of time even when used under severe conditions such that the rolling bearing is exposed to muddy water. Further, the addition of an electrical conductivity providing agent to the rubber composition makes it possible to provide the elastic member with a good electrical conductivity while maintaining desired sealing properties. Accordingly, the rolling bearing according to the invention can prevent the generation of radio noise when used for vehicle.

While the invention has been described in detail and with reference to specific embodiments thereof, it will be apparent to one skilled in the art that various changes and modifications can be made therein without departing from the spirit and scope thereof.

What is claimed is:

1. A rolling bearing comprising:
   an outer ring having an outer raceway formed on the inner surface thereof;
   an inner ring having an inner raceway formed on the outer surface thereof;
   a plurality of rolling elements rollably provided between said outer ring and said inner ring so as to move one of said outer and inner rings relative to the other; and
   a sealing member for sealing the axial opening of the space between the inner surface of said outer ring and the outer surface of said inner ring in which said rolling elements are provided,
   wherein said sealing member is formed by an elastic member made of a vulcanizable rubber composition obtained by blending a carboxylated acrylonitrile-butadiene rubber with at least carbon black.

2. The rolling bearing as set forth in claim 1, wherein the amount of carbon black to be blended in said rubber composition is in a range from 15 to 80 parts by weight based on 100 parts by weight of said carboxylated acrylonitrile-butadiene rubber.

3. The rolling bearing as set forth in claim 2, wherein said rubber composition further comprises:
   an electrically-conductive carbon black incorporated therein in an amount of from 2 to 40 parts by weight based on 100 parts by weight of said carboxylated acrylonitrile-butadiene rubber.

4. The rolling bearing as set forth in claim 2, wherein said rubber composition exhibits an electrical resistance of lower than $10^5$ Ω·cm as calculated in terms of volume resistivity.

5. The rolling bearing as set forth in claim 4, wherein said rubber composition further comprises:
   an electrically-conductive carbon black incorporated therein in an amount of from 2 to 40 parts by weight based on 100 parts by weight of said carboxylated acrylonitrile-butadiene rubber.

6. The rolling bearing as set forth in claim 1, wherein said rubber composition exhibits an electrical resistance of lower than $10^5$ Ω·cm as calculated in terms of volume resistivity.

7. The rolling bearing as set forth in claim 6, wherein said rubber composition further comprises:
   an electrically-conductive carbon black incorporated therein in an amount of from 2 to 40 parts by weight based on 100 parts by weight of said carboxylated acrylonitrile-butadiene rubber.

8. The rolling bearing as set forth in claim 1, wherein said rubber composition further comprises:
   an electrically-conductive carbon black incorporated therein in an amount of from 2 to 40 parts by weight based on 100 parts by weight of said carboxylated acrylonitrile-butadiene rubber.

9. The rolling bearing as set forth in claim 8, wherein the amount of silicone oil to be incorporated in said rubber composition is within a range from not smaller than 0.2 parts by weight to less than 30 parts by weight based on 100 parts by weight of said carboxylated acrylonitrile-butadiene rubber.

10. The rolling bearing as set forth in claim 1, wherein said carboxylated acrylonitrile-butadiene rubber further comprises a silicone oil incorporated therein.

11. The rolling bearing as set forth in claim 10, wherein said silicone oil is a homopolymer of straight silicone oil or a polymer of two or more straight silicone oils or a modified silicone oil.

12. The rolling bearing as set forth in claim 10, wherein the amount of said silicone oil to be incorporated in said rubber composition is within a range from not smaller than 0.2 parts by weight to less than 30 parts by weight based on 100 parts by weight of said carboxylated acrylonitrile-butadiene rubber.

13. The rolling bearing as set forth in claim 11, wherein said silicone oil has a dynamic viscosity of from 20 to 100,000 m$^2$/S at 25° C.

14. The rolling bearing as set forth in claim 12, wherein the amount of said silicone oil to be incorporated in said rubber composition is within a range from not smaller than 0.2 parts by weight to less than 30 parts by weight based on 100 parts by weight of said carboxylated acrylonitrile-butadiene rubber.

15. The rolling bearing as set forth in claim 10, wherein said silicone oil has a dynamic viscosity of from 20 to 100,000 mm$^2$/S at 25° C.

16. The rolling bearing as set forth in claim 15, wherein the amount of said silicone oil to be incorporated in said rubber composition is within a range from not smaller than 0.2 parts by weight to less than 30 parts by weight based on 100 parts by weight of said carboxylated acrylonitrile-butadiene rubber.

* * * * *